(12) United States Patent
Carew

(10) Patent No.: US 9,269,976 B2
(45) Date of Patent: Feb. 23, 2016

(54) FILTER APPARATUS

(71) Applicant: E. Bayne Carew, Milford, MI (US)

(72) Inventor: E. Bayne Carew, Milford, MI (US)

( * ) Notice: Subject to any disclaimer, the term of this patent is extended or adjusted under 35 U.S.C. 154(b) by 0 days.

(21) Appl. No.: 14/722,333

(22) Filed: May 27, 2015

(65) Prior Publication Data

US 2015/0263367 A1    Sep. 17, 2015

Related U.S. Application Data

(60) Continuation of application No. 13/536,527, filed on Jun. 28, 2012, now Pat. No. 9,131,667, which is a continuation-in-part of application No. 12/208,869, filed on Sep. 11, 2008, now Pat. No. 8,329,037, which (Continued)

(51) Int. Cl.
*H01M 8/06* (2006.01)
*A01K 63/04* (2006.01)

(Continued)

(52) U.S. Cl.
CPC ............ *H01M 8/0643* (2013.01); *A01K 63/045* (2013.01); *B01D 3/141* (2013.01); *B01D 29/15* (2013.01); *B01D 29/48* (2013.01);

(Continued)

(58) Field of Classification Search
CPC ......... A01K 63/045; C02F 1/32; C02F 1/001; C02F 1/4691; B01D 29/48; B01D 36/003; B01D 29/15; B01D 29/23
USPC ........... 210/198.1, 748.1, 636, 639, 650, 651, 210/321.83, 321.84, 321.85, 298, 304, 319, 210/321.63, 350, 351, 355, 360.1, 374, 210/413–415, 512.3, 370, 252, 179, 243

See application file for complete search history.

(56) References Cited

U.S. PATENT DOCUMENTS 2,569,748 A   10/1951   DeGrave
4,041,854 A    8/1977   Cox (Continued)

FOREIGN PATENT DOCUMENTS

EP    774288 A1   5/1997
GB    945614 A    1/1994

(Continued)

OTHER PUBLICATIONS

Translation of RU 2077925 C1, Publication date Apr. 1997, Krapukhin Vladimir B.*

(Continued)

*Primary Examiner* — Walter D Griffin
*Assistant Examiner* — Cameron J Allen
(74) *Attorney, Agent, or Firm* — Warner Norcross & Judd LLP

(57) ABSTRACT

A centrifugal filter apparatus including a canister housing having a frusto-conical internal surface, and outlet adjacent the minor diameter of the internal surface and an inlet spaced axially toward a major diameter, a central annular filter element and centrifugal radial rotating fins extending radially from adjacent the external surface of the filter element to adjacent the generally frusto-conical internal surface of the canister having a generally frusto-conical outer surface conforming to the frusto-conical internal surface of the canister. In one embodiment, the filter apparatus includes a plurality of reaction canisters, where the outlet of the first canister is the inlet of the second canister and the radial fins drive reaction products from the first canister to the second canister.

5 Claims, 16 Drawing Sheets

Related U.S. Application Data is a continuation-in-part of application No. 11/942,525, filed on Nov. 19, 2007, now Pat. No. 7,513,372, and a continuation-in-part of application No. 11/531,986, filed on Sep. 14, 2006, now abandoned, which is a division of application No. 10/863,798, filed on Jun. 8, 2004, now Pat. No. 7,122,123, which is a division of application No. 09/931,510, filed on Aug. 16, 2001, now Pat. No. 6,761,270.

(60) Provisional application No. 60/225,895, filed on Aug. 17, 2000, provisional application No. 60/986,667, filed on Nov. 9, 2007.

(51) Int. Cl.
| | | |
|---|---|---|
| *B01D 29/15* | (2006.01) | |
| *B01D 29/48* | (2006.01) | |
| *B01D 36/00* | (2006.01) | |
| *B01D 37/02* | (2006.01) | |
| *B01D 3/14* | (2006.01) | |
| *C02F 1/00* | (2006.01) | |
| *C02F 1/38* | (2006.01) | |
| *C02F 1/40* | (2006.01) | |

(52) U.S. Cl.
CPC ............ *B01D 36/003* (2013.01); *B01D 37/025* (2013.01); *B01D 2201/0415* (2013.01); *B01D 2201/184* (2013.01); *C02F 1/001* (2013.01); *C02F 1/385* (2013.01); *C02F 1/40* (2013.01)

(56) References Cited

U.S. PATENT DOCUMENTS

| | | |
|---|---|---|
| 4,171,264 A | 10/1979 | Benson et al. |
| 4,173,527 A | 11/1979 | Heffley et al. |
| 5,149,422 A | 9/1992 | Barrington |
| 5,229,014 A | 7/1993 | Collins |
| 6,328,884 B1 | 12/2001 | Kunkel |
| 7,182,921 B2 | 2/2007 | Miura et al. |
| 2005/0133459 A1 | 6/2005 | Schulz |
| 2007/0124997 A1 | 6/2007 | Liu et al. |
| 2008/0290018 A1 | 11/2008 | Carew |

FOREIGN PATENT DOCUMENTS

| | | |
|---|---|---|
| RU | 2077925 | 4/1997 |
| RU | 2077925 C1 * | 4/1997 |
| WO | 2008030805 A1 | 3/2008 |

OTHER PUBLICATIONS

PCT/US2009/066415 International Search Report dated Jan. 28, 2010, 2 pages.
English translation to Russian Patent No. 2077925 C1, Dec. 29, 1992.

* cited by examiner

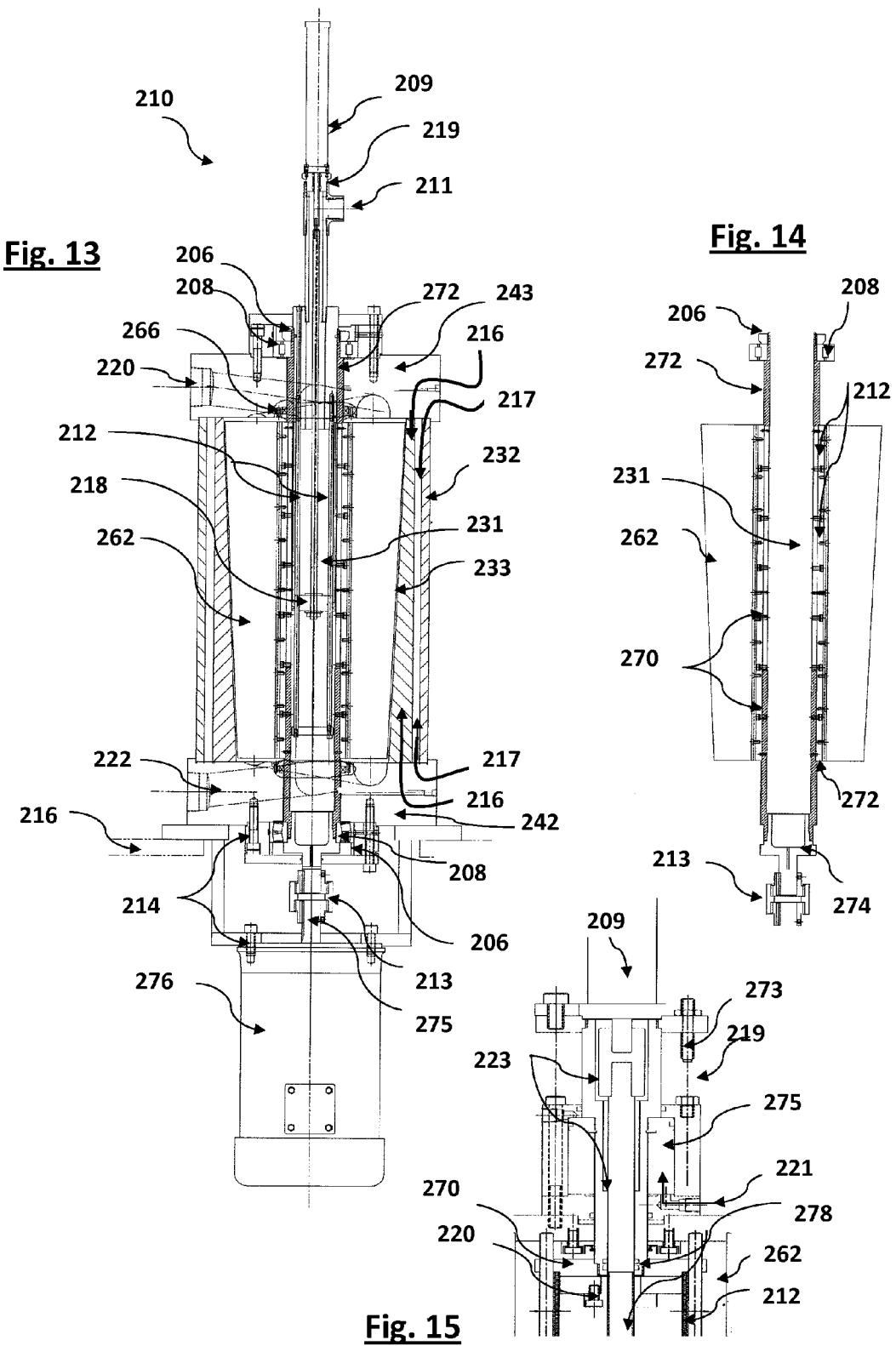

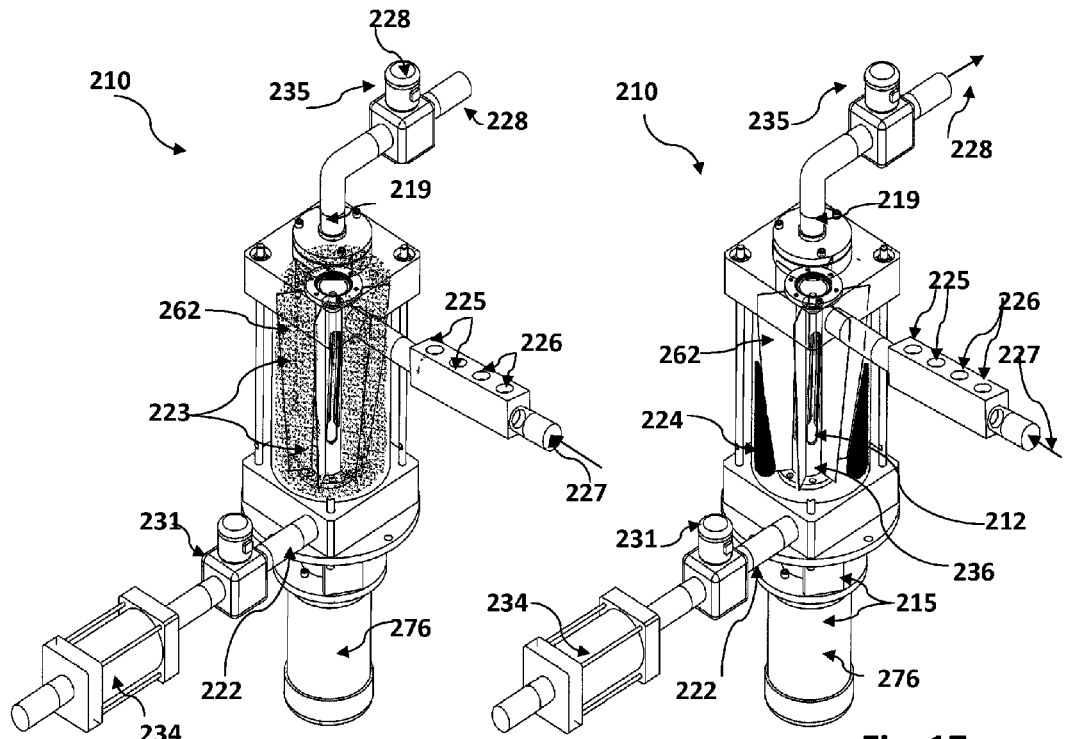
Fig. 16  Fig. 17
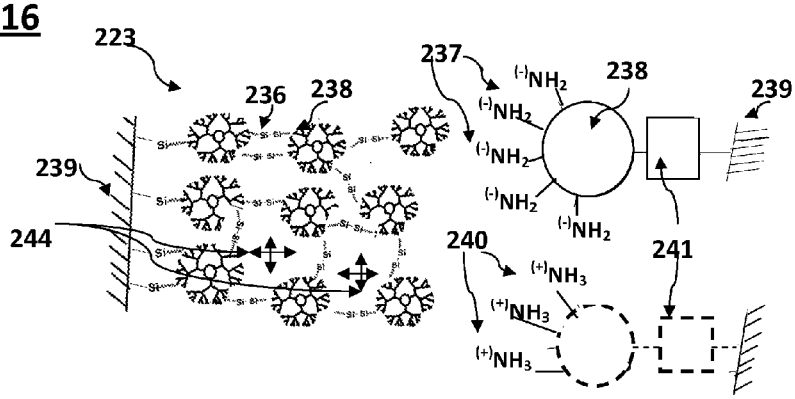
Fig. 18
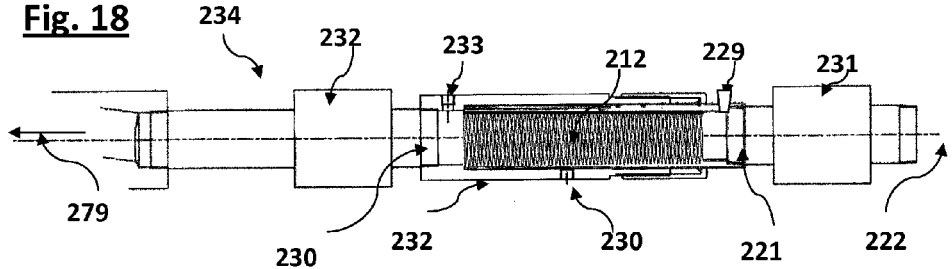

FILTER APPARATUS

RELATED APPLICATIONS

This Application claims priority to a U.S. Provisional Application Ser. No. 61/502,549 filed Jun. 29, 2011 and U.S. Provisional Application Ser. No. 61/359,432 filed Jun. 29, 2011; this application is a continuation application of U.S. Ser. No. 13/536,527, filed Jun. 28, 2012, which application is a continuation in part application Ser. No. 12/208,869 filed on Sep. 11, 2008, which application was a continuation in part application of U.S. Ser. No. 11/942,525, filed Nov. 19, 2007, now U.S. Pat. No. 7,513,372 issued on Apr. 7, 2009, which application was a continuation in part application of U.S. Provisional Application Ser. No. 60/986,667 filed on Nov. 11, 2007 and continuation in part application of U.S. Ser. No. 11/531,986, filed Sep. 14, 2006, which application was a divisional application of U.S. Ser. No. 10/863,798, filed on Jun. 8, 2004 now U.S. Pat. No. 7,122,123 issued Oct. 17, 2006, which application was a divisional application of U.S. Non-Provisional application Ser. No. 09/931,510 filed Aug. 16, 2001, now U.S. Pat. No. 6,761,270 issued Jul. 13, 2004 which application claims priority to U.S. Provisional Patent Application No. 60/225,895, filed Aug. 17, 2000.

FIELD OF THE INVENTION

This invention relates to a filter apparatus, particularly including a dual-chambered, centrifugal and compressive filtration apparatus for separating dry waste solids and fluids. In variations of this apparatus, bio-solids are reformed into valuable fuels for direct feed into fuel cells through a series of closely coupled reaction chambers. The filtration device of this invention may be used to remove micron sized suspended solids in fluids, refine or purify fluid fractions for recycling and separation of immiscible liquids and solids into three phases.

BACKGROUND OF THE INVENTION

Residential, industrial, agricultural water and oil based wastes are potentially a rich source of carbon that may be recycled or transformed to fuels. A prerequisite for transformation to fuel is generating a clean and dry solid feed source, which the centrifugal filter variations of this invention are designed to do. Unprocessed wastes often include increasingly scarce fresh water, and potentially valuable sources of hydrocarbon fuels. Disposal of wastes are now regulated under discharge limits found in numerous Federal guidelines covering Industrial Pre-treatment, National Pollution Discharge, Effluent Limitations, and Concentrated Animal Feedlot. Many wastes sources are excluded from landfills, and land application is restricted for reasons of health and environmental safety. Current municipal and animal waste treatment systems employ some combination of chemical additives and mechanical settling means to separate solids from water, which are costly to operate and maintain. By contrast, the double chambered high speed centrifugal filtration of this invention will purify or refine fluids generated in the solids-liquids separation, as well as dry and stabilize the solid products. This combination is relatively small, mobile and does not require chemical pretreatment. In various formats the centrifugal filter of this invention will generate fuel and energy by means of well known thermal processes, including flash pyrolysis and fuel reforming chemistries. The centrifugal filter reactor column embodiments include means and methods to purify water, generate useful hydrocarbons and electric power in highly integrated and stacked formats for continuous processing. These formats represent a significant contribution to cost mitigation in waste management.

The filtration apparatus of this invention also addresses the need to separate solids contaminated, waste water from emulsified fats and oils, including drilling muds. The flat wire apertures of this device successfully break the emulsion, which may thereafter be continuously separated into waste solids, water and oil phases without chemicals. A further improvement in purification (refining) of water and oil or other hydrocarbons is achieved in the high throughput centrifugal filter cone using selective adsorbents. This combination device removes and releases dissolved solids from the solvating liquids, while regenerating the adsorbent in a series of continuous cycles.

SUMMARY OF THE INVENTION

This invention relates to a cylindrical or cone-shaped centrifugal filter column for removing dissolved and suspended solids from municipal, industrial and agricultural wastes, generating potable water and recycled oil and bio-solids as feed stock for hydrocarbon fuels generation. Inorganic chelates, including heavy metal contaminants and solvated precious metals from mining ores, organic constituents and toxins may be isolated and purified. Such purification with the centrifugal filter occurs in a series if integrated adsorption, desorption, product isolation and adsorbent regeneration cycles. The process is integrated with a selective adsorbent, tunable to dissolved solid properties, but running at high through-put rates attributable to the physical properties of the centrifugal cone filter. Variations of this filtration device, operating at greatly elevated temperatures or at condensing ranges in the cold, are combined in stacks for continuous flow operations from biomaterials processing to hydrocarbon generation and feed to fuel cells.

In one disclosed embodiment, the filter apparatus of this invention comprises a continuous resilient generally cylindrical helical coil including a plurality of inter-connected generally circular coils, wherein each coil has a substantially regular sinusoidal shape in the direction of the helix, including opposed top and bottom surfaces of adjacent coils in contact at circumferentially spaced locations forming loop-shaped filter pores between adjacent coils. In the disclosed embodiment, the continuous flexible resilient generally cylindrical helical coil is formed from flat wire stock, such that the top and bottom surfaces of the inter-connected generally circular coils have opposed flat top and bottom surfaces with the flat top and bottom surfaces of adjacent coils in contact forming the loop-shaped filter pores. In the disclosed embodiment, the filter assembly includes a filter drive engaging the helical coil to increase or decrease the volume of the filter pores to filter materials of a selected size. In a disclosed embodiment of the filter apparatus of this invention, the filter apparatus includes a first filter drive engaging the helical coil compressing or releasing compression of the helical coil to increase or decrease a volume of the loop-shaped filter pores. Further, in the disclosed embodiment of the filter apparatus of this invention, the apparatus includes a second filter drive engaging the helical coil and rotating at least one of the generally circular helical coils relative to a remainder of the circular coils into an out of registry, thereby modifying and accurately controlling a volume of the loop-shaped filter pores. The first filter drive, for example, may include a piston driven against the helical coil by pneumatic or hydraulic pressure for controlling the volume of the filter pores and for quick release and expansion during purging. In the disclosed embodiment, the second filter drive may be a stepper motor for example connected to one of the helical coils and accurately rotating and controlling rotation of one of the generally circular helical coils relative to a remainder of the coils rotating the helical coils into and out of registry and very accurately controlling the volume of the filter pores from substantially zero to a predetermined volume. The flat top and bottom surfaces may also include radial grooves providing flow of fluids through the helical coil and filtering fluids into the submicron pore size. For example, the grooves may have a depth of between 0.1 mm and 1 micron, or less. The diameter of the generally cylindrical coil will also depend upon the application.

In the disclosed embodiments of the centrifugal filter apparatus of this invention, the apparatus includes a canister housing having a conical internal surface, an inlet and at least one outlet. The filter apparatus includes a central, generally cylindrical annular filter element, having a plurality of circumferentially spaced filter pores which may be the disclosed resilient generally cylindrical helical coil described above and disclosed in this application or an alternative conventional generally cylindrical annular filter. In the disclosed embodiment, the filter apparatus further includes rotating external centrifugal radial fins extending generally radial from an adjacent external surface of the annular filter element to adjacent the cylindrical or conical internal surface of the canister housing and a drive mechanism rotating the external centrifugal radial fins which drive solids in the filter canister radially outwardly against the cylindrical or conical internal surface of the canister which may be removed through a solids outlet adjacent the outer wall. In one embodiment, the external centrifugal radial fins are cantered and have the generally isosceles trapezoid form to conform to the conical internal canister surface. In the disclosed embodiment, the centrifugal filter apparatus of this invention further includes internal centrifugal radial fins rotatably supported within the annular filter element and the drive mechanism rotates both the external and internal centrifugal radial fins. In one embodiment, the internal centrifugal radial fins are canted, and generally helical with a constant negative curvature, driving liquid supernatant downwardly through a generally axial liquid outlet; in another embodiment, the fins are assembled radially in multiples coupled to a central, hollow multiport column. The multiport arrangement circulates fluids or solids vertically both upward and downward, in split stream manner, within the inner compartment. Further, the external centrifugal radial fins may also be canted and the radial fins may be rotatably driven by the drive mechanism in the same direction during filtering and the internal centrifugal radial fins may be rotated in the opposite direction during purging. It will be understood from the illustrations to follow that the length to width ration of these fins is generally greater than 4 to 1 to generate a fluid spiral movement along the centrifugal column. However, there is included in another embodiment, a set of fins in which the width to length ratio is 4 to 1 or greater; the fins in this format also extend radially from the central drive, but they are multi-fin assemblies canted radially. The fins consist of a central blade with two wings, which, during clockwise rotation about the central axis, transport contained fluids bi-directionally within the column. This 4W/1L fin embodiment also generates a spiral movement of fluids as does the 4L/1W format. It will be shown to have a different function, namely, maximizing heat transport in modified centrifugal filters in which the fins of the inner compartment, inside the filter, require an efficient heat and fluid transport mechanism.

It is thus an object of this invention to provide a filtration apparatus for separating and extracting suspended and dissolved solids from waste fluids, reducing the isolated solids to a state of substantial dryness for conversion to fuels and stable fertilizers. Suspended solids are initially separated in a wet state at the base of the column by centrifugation, then fed through a valve to the core of a filter canister where the remaining free fluids are pneumatically or mechanically expressed, forming a dry plug for discharge. The dissolved solids in the filtrate, centripetally separated, are pumped into a second centrifugal filter containing an adsorbent which is preferably selective for the dissolved organic or inorganic agents, whereupon the adsorbed agents are first rapidly sequestered then stripped from the adsorbent by a series of spin-dry cycles, with the adsorbent's activity being regenerated in a final cycle. The filtrate fluids are thus processed for recycling. In some applications, the organic or inorganic chemical species is to be concentrated and discarded, as in toxins, heavy metals or other wastes including traces of oils or fats. In other applications, the isolated and sequestered species may be a precious metal compound, such as a gold cyanate extract from ore, wherein the cyanate is removed in the decoupling cycle and the gold isolated centrifugally as a solid precipitate. The disclosed embodiment of the centrifugal filter apparatus of this invention may include one or more centrifugal functions separated by a self-cleaning sinusoidal coil whose apertures may be precisely regulated in size and shape. Numerous dissolved solids separation cycles and applications noted are accomplished in a linear series of coupled centrifugal filters or, alternatively, within a stacked series.

In one embodiment of the series or stacked arrangements of centrifugal filters, the canister wall includes a liner, heated resistively or by superheated air. The heated liner pyrolyses carbonaceous solids in controlled atmospheres. The solids thus vaporized to black bio-oil are rapidly catalytically de-oxygenated and condensed in a coupled series of centrifugal conical filters. This series is similar in process and chemistry to numerous other well known, alternative fuels generating processes, which will be noted. There is described a spacing between the insulating outer canister jacket and inner liner, which is used either as a space through which a refrigerant fluid or superheated air is circulated, for flash condensation of hot hydrocarbon vapors or flash pyrolysis.

Not only may centrifugal and vertical transport functions occur internal and external to the sinusoidal filter coil, but the coil itself may be compound, i.e., the coils may be assembled concentric to one another, in a nested configuration as in FIGS. 8A and 8B, U.S. Pat. No. 7,531,372, except that the baffle separating the two filters is a solid electrolyte and the concentric filters are electrodes, as in a fuel cell. Therein, the filter apertures are the electrical conductors within which are heat fused the reducing or oxidizing agents. The combination constitutes a fuel cell. Since this fuel cell must operate at elevated temperatures within the same range as hydrocarbon fuels are generates, the reasons for their being stacked or closely coupled will be understood. The fuels generation and condensation processes are also extremely time dependent, on the order of microseconds to seconds, which further justifies the sacking design embodiments detailed in the following.

As will be understood by those skilled in this art, various modifications may be made the filter apparatus of this invention within the purview of the appended claims. The following description of the preferred embodiments and the embodiments of the filter apparatus disclosed in the appended drawings are for illustrative purposes only and do not limit the scope of this invention except as set forth in the appended claims. Further advantages and meritorious features of the filter apparatus of this invention will be more fully understood from the following description of the preferred drawings and the appended claims, a brief description of which follows.

BRIEF DESCRIPTION OF THE DRAWINGS

FIG. 13 is a partial side cross-sectional view of the centrifugal filter apparatus with the internal radial fins within a double walled, cone shaped canister;

FIG. 14 is a partial side view of the internal radial centrifugal fins, as shown in FIG. 13, mounted on a pitch adjustable bracket; and FIG. 15 is a partial side view of the dual aperture adjustment mechanisms;

FIG. 16 is a partial 3 dimensional view of the centrifugal filter apparatus with an appended drying tube and reagent feed with suspended adsorbent;

FIG. 17 is a partial 3 dimensional view of the centrifugal filter apparatus with appended drying tube and reagent feed, as shown in FIG. 15, with spun-dry adsorbent;

FIG. 18 is a partial cross-sectional side view of the solids drying tube;

DESCRIPTION OF THE PREFERRED EMBODIMENTS

As set forth above, the embodiments of the filter assembly of this invention disclosed in the following description of the preferred embodiments are for illustrative purposes only and various modifications may be made to such embodiments within the p and 9urview of the appended claims. Referring to the figures, wherein like numerals indicate like or corresponding parts throughout the several views, a filter assembly for filtering a fluid is generally disclosed at 10. It is understood that the filter apparatus 10 and method of this invention is capable of filtering both liquids and gases as the fluid. However, the filter apparatus 10 of the subject invention is more preferably used to filter fluids having solid particles including, without limitation, slurries of biological or organic waste, including oils. As such, the filter apparatus 10 may be used in combination with other devices, including ion exchange or chelation affinity apparatus for a filter press as discussed further below.

Figure 1:
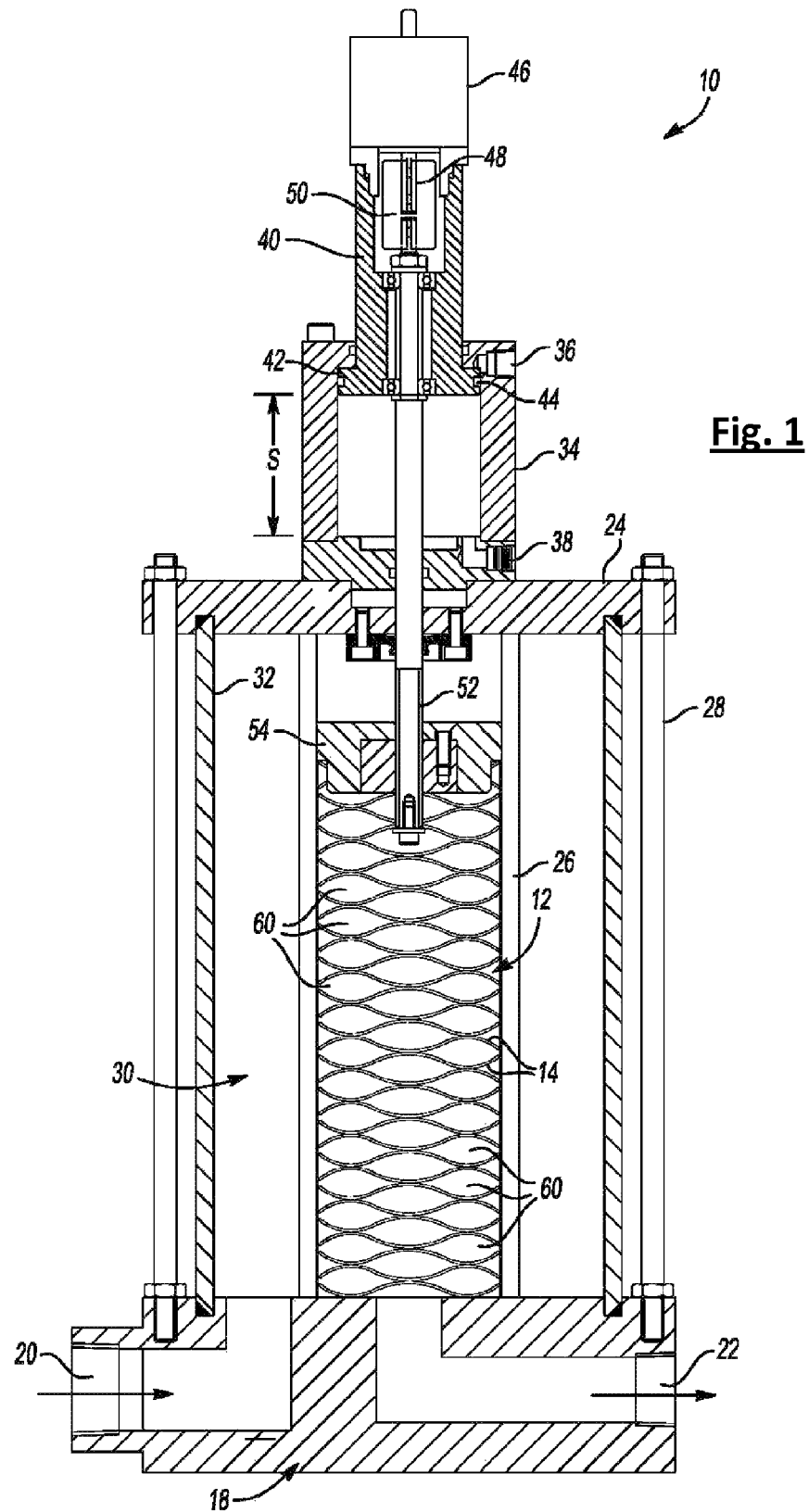
FIG. 1 is a partially cross-sectioned side view of one embodiment of a filter assembly of this invention with the filter element fully expanded.
Figure 2:
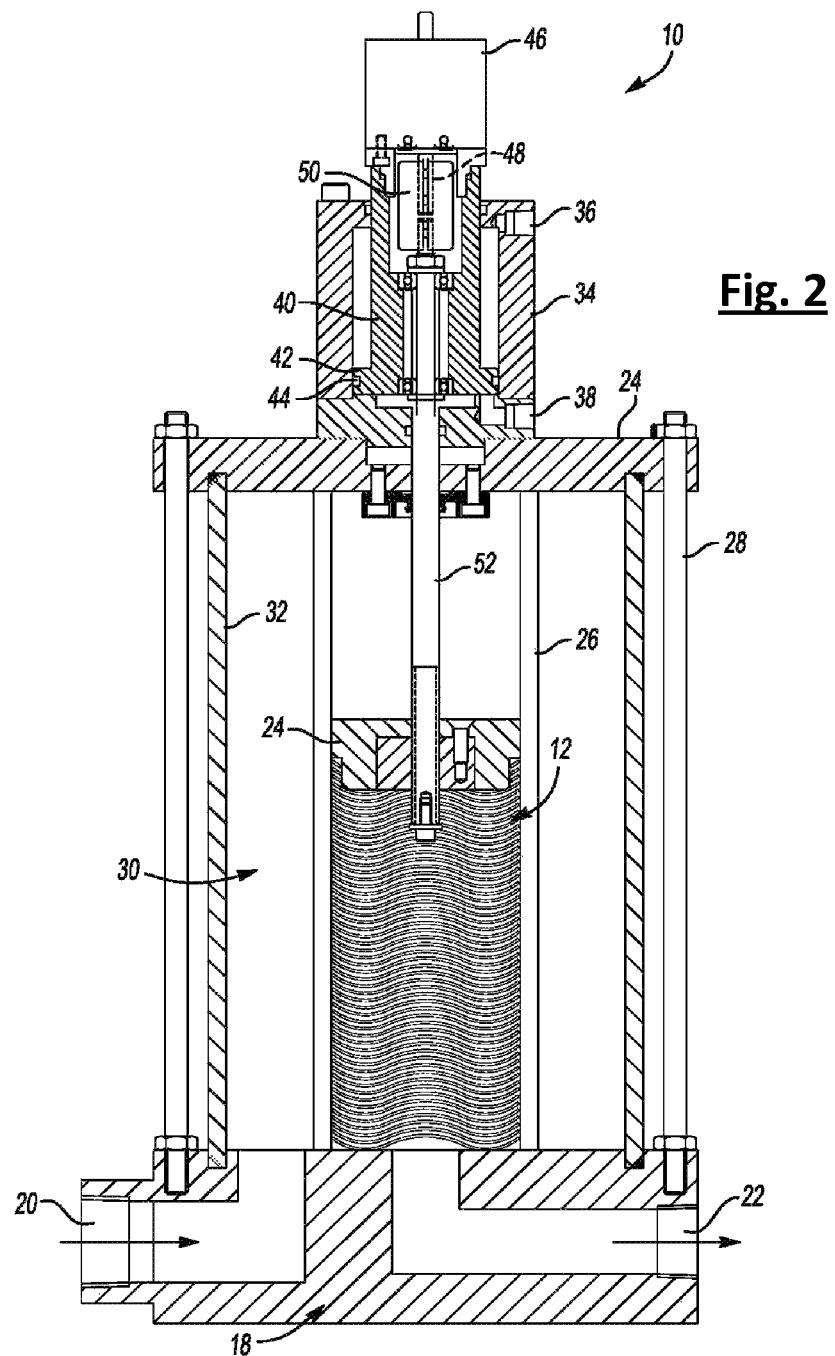
FIG. 2 is a partially cross-sectioned side view of the filter assembly shown in FIG. 1 with the coils of the filter in registry and substantially compressed.
Figure 3:
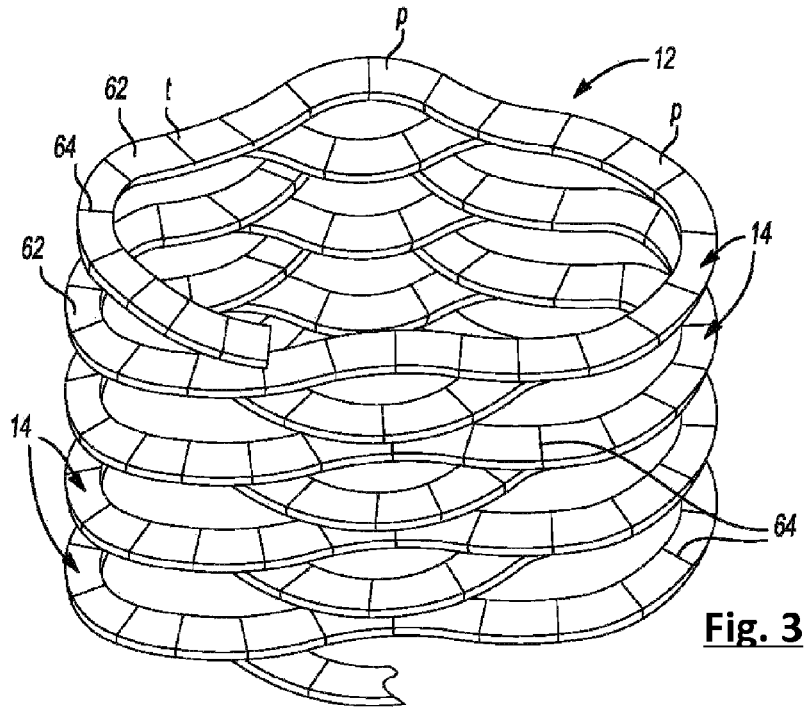
FIG. 3 is a partial top perspective view of the filter element shown in FIG. 1.
Figure 4:
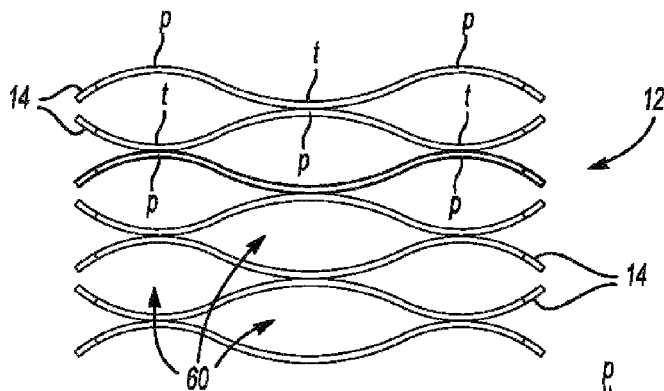
FIG. 4 is a partial side view of the expanded filter element shown in FIG. 1.

FIGS. 1 to 6 illustrate one embodiment of the filter assembly 10 of this invention which may be utilized to perform the methods of filtration described herein. The filter assembly 10 shown in FIGS. 1 and 2 includes a filter element 12 includes a continuous generally cylindrical helical coil having a plurality of circular interconnected helical coils 14 as best shown in FIG. 3, wherein each circular helical coil has a plurality of regular sinusoidal wave forms or shapes including circumferentially spaced peaks and troughs as shown in FIG. 3. The peaks "p" and troughs "t" of adjacent coils 4 are in contact to provide enlarged "loop-shaped" or eyelet-shaped filter pores between adjacent coils as shown in FIG. 4, or the peaks "p" and troughs "t" of adjacent coils 14 may be aligned as shown for example in FIG. 6 as described below.

The filter assembly 10 shown in FIGS. 1 and 2 includes a lower housing 18 having an inlet 20 and an outlet 22 for receiving a fluid stream to be filtered, such as a waste gas or liquid stream as described above. The filter assembly 10 further includes a cover 24 which is supported on the lower housing member 18 by circumferentially spaced inner and outer retention posts 26 and 28, respectively. A filtration chamber 30 is defined between the lower housing member 18 and the cover 24 by a cylindrical housing wall 32. Thus a fluid stream received through inlet 20 is received under pressure in the filtration chamber 30 for filtration by the filter element 12. The fluid stream including contaminants is then received through the filter pores or the radial grooves as described below through the filter element 12 into the axial center of the filter element 12 and the filtrated fluid is then discharged through the outlet 22. As described above, the particles, molecules or material removed by the filter element are removed by backwashing as further described below.

This embodiment of the filter assembly 10 shown in FIGS. 1 and 2 further includes a pneumatic cylinder 34 attached to and supported on the cover 24 of the housing having an air inlet 36 and an air outlet 38. A piston assembly 40 is reciprocally supported in the pneumatic cylinder or chamber 34 including a piston head 42 having an O-ring 44, such that the piston assembly 40 is sealingly supported within the pneumatic cylinder 34. The piston assembly 40 has a stroke "S" as shown in FIG. 1. Pneumatic pressure supplied through air inlet 36 of the pneumatic cylinder 34 will thus drive the piston assembly 40 downwardly from the position shown in FIG. 1 to the position shown in FIG. 2 as described in more detail hereinbelow.

In the disclosed embodiment, the filter assembly 10 further includes a drive assembly engaging the helical coil filter element 12 moving adjacent coils 14, thereby modifying and controlling a volume of the loop-shaped filter pores between adjacent coils as now described. In the disclosed embodiment, the filter assembly 10 includes a stepper motor 46 attached to and supported by the upper end of the piston assembly 40 as shown in FIGS. 1 and 2. As will be understood by those skilled in this art, a stepper motor is a brushless, synchronous electric motor that can divide a full rotation into a large number of steps. When commutated electronically, the motor's position can be controlled precisely, without any feedback mechanism. Although a stepper motor has several advantages for this application, any other type of rotary drive may also be utilized. The driveshaft 48 of the stepper motor 46 is connected in the disclosed embodiment to an upper end of the cylindrical helical filter element 12 to relatively rotate the filter coils to accurately control the volume of the loop-shaped filter pores 60 as described below. The driveshaft 48 of the stepper motor 46 in the disclosed embodiment is connected to a coupling 50 as shown in FIGS. 1 and 2. A shaft 52 connected to the coupling 50 is connected to a clamp assembly connected to the upper end of the filter element 12. The lower end of the filter element 12 is rigidly connected to the lower housing member 18 such that, upon rotation of the clamp assembly 54 by the stepper motor 46, the coils 14 of the filter element 12 are rotated relative to each other as described below.

In the disclosed embodiment, the circular interconnected coils 14 of the filter element 12 are initially aligned crest or peak "p" to trough "t" as shown in FIG. 4 with the filter pores or openings 60 enlarged to their maximum. Alternatively, it would also be possible to initially align the coils peak to peak and trough to trough. It is important to understand, however, that the width or amplitude of the sinusoidal wave or curve has been greatly exaggerated in FIGS. 1, 3 and 4 for a better understanding of the filter assembly of this invention and the method of filtration. As set forth above, the volume of the openings or loop-shaped filter pores 60 of the filter element 12 in the filter apparatus of this invention may be accurately controlled to filter different fluids. First, the piston assembly 40 may simply be extended to compress the filter element, thereby reducing the size or volume of the filter pores 60 by supplying air under pressure through the inlet 36 of the pneumatic cylinder 34. However, in one preferred embodiment, the drive 46 rotates at least one of the coils 14 relative to the remainder of the coils, thereby relatively sliding the opposed flat top and bottom surfaces of adjacent coils relative to each other into and out of registry, thereby accurately controlling the volume of the loop-shaped pores 60. Further, because the filter element 12 is formed of a stiff resilient metal, such as stainless steel, the loop-shaped filter pores 60 are all modified simultaneously, such that all filter pores have essentially the same volume, which is important for accurate control.

Figure 5:
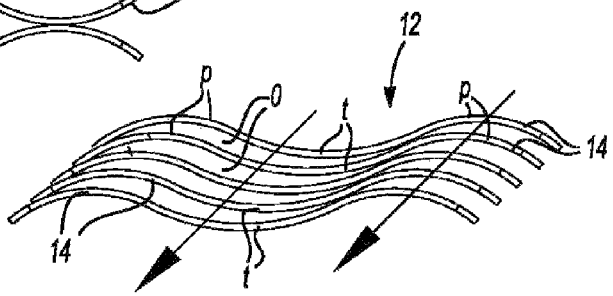
FIG. 5 is a partial side view of the filter element shown in FIG. 4 with the filter coils partially in registry, reducing the size of the filter pores.
Figure 6:
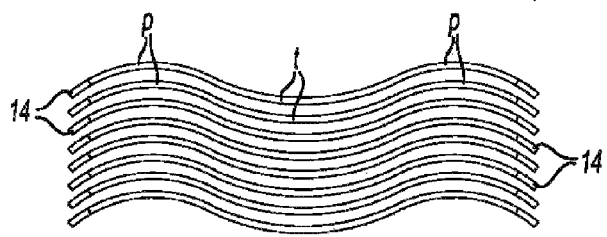
FIG. 6 is a partial side view of the filter elements shown in FIGS. 4 and 5 with the filter coils in full registry as shown in FIG. 2.

As best shown in FIG. 5, rotation of the upper coil of the continuous cylindrical helical coil filter element 12, by rotation of the driveshaft 48 of the stepper motor 46 causes the peaks "p" of adjacent coils to rotatably slide on the flat upper and lower surfaces 62 relative to the remaining coils, reducing or expanding the apertures or filter pores 60. Finally, as shown in FIG. 6, the sinusoidal-shaped coils may be moved or rotated into full registry, such that the peaks "p" and troughs "t" are fully aligned. Again, however, the spacing between adjacent coils 14 has been exaggerated in FIG. 6 for clarity. In fact, the adjacent coils may be in full contact, such that the filter pores 60 between adjacent filter coils is reduced to essentially zero. However, in the disclosed embodiment, at least one of the opposed flat surfaces 62 of the filter coils 14 includes circumferentially spaced radial grooves 64 permitting the flow of fluids through the filter element when the filter pores 60 between adjacent coils are reduced to substantially zero. Thus the radial grooves 64 significantly increase the applications for the filter assembly 10 of this invention.

Having described the embodiment of the filter assembly 10 of this invention as shown in FIGS. 1 to 6, the operation of the filter assembly may now be described. In one embodiment of the filter apparatus 10 of this invention, the filter element 12 is a continuous substantially cylindrical resilient helical coil having a regular sinusoidal shape including regular peaks "p" and troughs "t" as described above. The filter element may be formed of stainless steel, such as 316 stainless steel, which is stiff and resilient. However, the helical coil filter element may also be formed of a Hastaloy or other steel or even plastic. Another advantage of stainless steel is corrosion resistance. The coil preferably has flat top and bottom surfaces 62, such that the flat surfaces of adjacent coils will slide against each other during rotation as best shown in FIGS. 4 to 6. A suitable thickness between the flat top and bottom surfaces 62 is 0.4 to 2 mm having a width of between 3 and 6 mm. The preferred number of sinusoidal waves of each coil will depend upon the application. However, it has been found that between 3 and 10 sinusoidal curves or waves for each coil 14 will be very suitable for most applications. Further, the "width" of the loop-shaped openings or filter pores will also depend upon the application, but it has been found that filter pores having a maximum width of about 0.5 mm is suitable for most applications. Finally, the depth of the radial grooves 64, which may be formed by laser etching, is preferably between 11 to 10 nanometers.

The filter assembly 10 is thus operated by adjusting the apertures or loop-shaped filter pores 60 to the desired volume for filtration depending upon the fluid to be filtered by either extending the shaft 52 using pneumatic pressure through inlet port 36, driving the piston assembly 40 downwardly in FIG. 1 to compress the coils against each other, thereby reducing the volume of the filter pores 60. However, in one preferred embodiment, the stepper motor 46 may be simultaneously rotated to bring the peaks "p" and troughs "t" into and out of registry as shown, for example, in FIG. 5. As described above, rotation of the upper coil will simultaneously rotate all coils relative to the bottom coil because the filter element is formed of a stiff resilient material, such as 316 stainless steel. The coils may be rotated into full registry, as shown in FIG. 6, wherein the filter pores are reduced to substantially zero and wherein the fluid flow is only through the radial grooves 64.

The fluid to be filtered is then received through the housing inlet 20 into the filter chamber 30 and flows through the filter element 12 as shown in FIG. 2. As will be understood, the filter apparatus may be used to filter almost any fluid depending upon the filter pore size including, for example, residential, industrial and agricultural waste and sludges to produce, for example, potable water from waste and may be used for the clarification and refinement of waste oil from waste water-oil mixtures, etc. Upon completion of the filtering process or when the filter element 12 becomes clogged with the particles or media suspended in the fluid, the filter element 12 may be easily flushed by opening the filter pores 60 as shown in FIG. 1 and flushing solution is then received through the outlet 22 and flushed through the filter element 12. In the disclosed embodiment, backwashing may be facilitated by rotating the stepper motor in the opposite direction from the direction used to compress the coils 14 of the filter coil while maintaining the clamp assembly 54 in the extended position as shown in FIG. 2. Then, upon completion of the filtering process, the filter element is "opened" by simply retracting the clamp 54 to the open position shown in FIG. 1 which can be accomplished in a second or two.

The filter apparatus 110 illustrated in FIGS. 7 to 12 may be characterized as a centrifugal filter apparatus or more specifically a dual-chambered centrifugal and compressive filtration apparatus for separating waste solids or fluids including, for example, waste solids in oils, water and gas. The elements of the centrifugal filter apparatus 110 are numbered where appropriate in the same sequence as the filter apparatus 10 described above, but in the 100 series to reduce the requirement for a detailed description of like components. The disclosed embodiment of the filter apparatus 110 includes a central annular filter element 112 which, in the disclosed embodiment, is a continuous flexible resilient generally cylindrical helical coil including a plurality of interconnected generally circular helical coils 114 as described above with reference to the filler element 12. However, the centrifugal filter apparatus of this invention may alternatively include any conventional annular generally cylindrical filter element although the helical filter element 112 is preferred in many applications.

The filter apparatus 110 includes a lower housing member 118, an inlet 120, a supernatant outlet 121 and a solids outlet 122. The disclosed embodiment of the filter apparatus 110 further includes upper housing members 123, 124 and 125, which are retained to the lower housing member 118 by circumferentially spaced retention posts. The disclosed embodiment includes a first annular filtration chamber 130 surrounding the annular filter element 112 and a second filtration chamber 131 within the annular filter element 112 as further described below. The first filtration chamber 130 is defined by the cylindrical housing wall 132 defining a cylindrical inner surface 133. In the centrifugal filter apparatus 110 of this invention, the internal wall 133 of the canister housing is preferably cylindrical to accommodate the centrifugal fins described below.

The disclosed embodiment of the filter apparatus 110 includes a first pneumatic port 136 adapted to compress the helical filter element 112 and a second pneumatic port 138 adapted to expand the helical filter element as described below. The apparatus further includes a pneumatic cylinder 134 receiving a piston 140 actuated by pneumatic pressure through the pneumatic ports 136 and 138 as described below. The disclosed embodiment of the filter apparatus 110 further includes a motor 142, such as a stepper motor described above, for rotating one or more of the helical coils 114 relative to a remainder of the helical coils into and out of registry to finely adjust the eyelet-shaped filter pores 160 between adjacent helical coils 114 as also described above. In this embodiment, the motor 142 includes a drive shaft assembly 144 connected to a drive gear 146. The drive gear 146 rotatably engages a driven gear 148 which is connected to a tubular driven shaft 150 connected to the upper helical coil 114 as described above with regard to the filter apparatus 10.

In one preferred embodiment, the helical filter element 112 includes both a first filter drive compressing or expanding the helical filter element and a second drive rotating one or more of the helical coils 114 into and out of registry for very accurately controlling the volume of the filter pores 116 between adjacent helical coils 114. In the disclosed embodiment, the first drive is a pneumatic drive, wherein pneumatic pressure received through inlet pneumatic port 136 drives the piston 140 downwardly in FIG. 7 to compress the helical filter element 112. Alternatively, the first drive may be hydraulic. An advantage of a pneumatic filter drive is that the compression on the helical filter element 112 may be released quickly during purging. Detailed or accurate control of the volume of the filter pores 116 in this embodiment is controlled by the second drive which, in the disclosed embodiment, is a stepper motor 142. The stepper motor 142 rotates the drive shaft 144, which rotates the drive gear 146. The drive gear 146 rotates the driven gear 148 and the tubular drive shaft 150 connected to the upper end of the helical filter element 112 to rotate at least one of the helical coils 114 relative to a remainder of the helical coils, thereby rotating the helical coils into and out of registry as described above. FIG. 8 illustrates the filter apparatus 110 after closing the filter pores 160 using the pneumatic adjustment mechanism and rotating the helical filter coils 114 into registry as described above with reference to FIG. 2.

Figure 7:
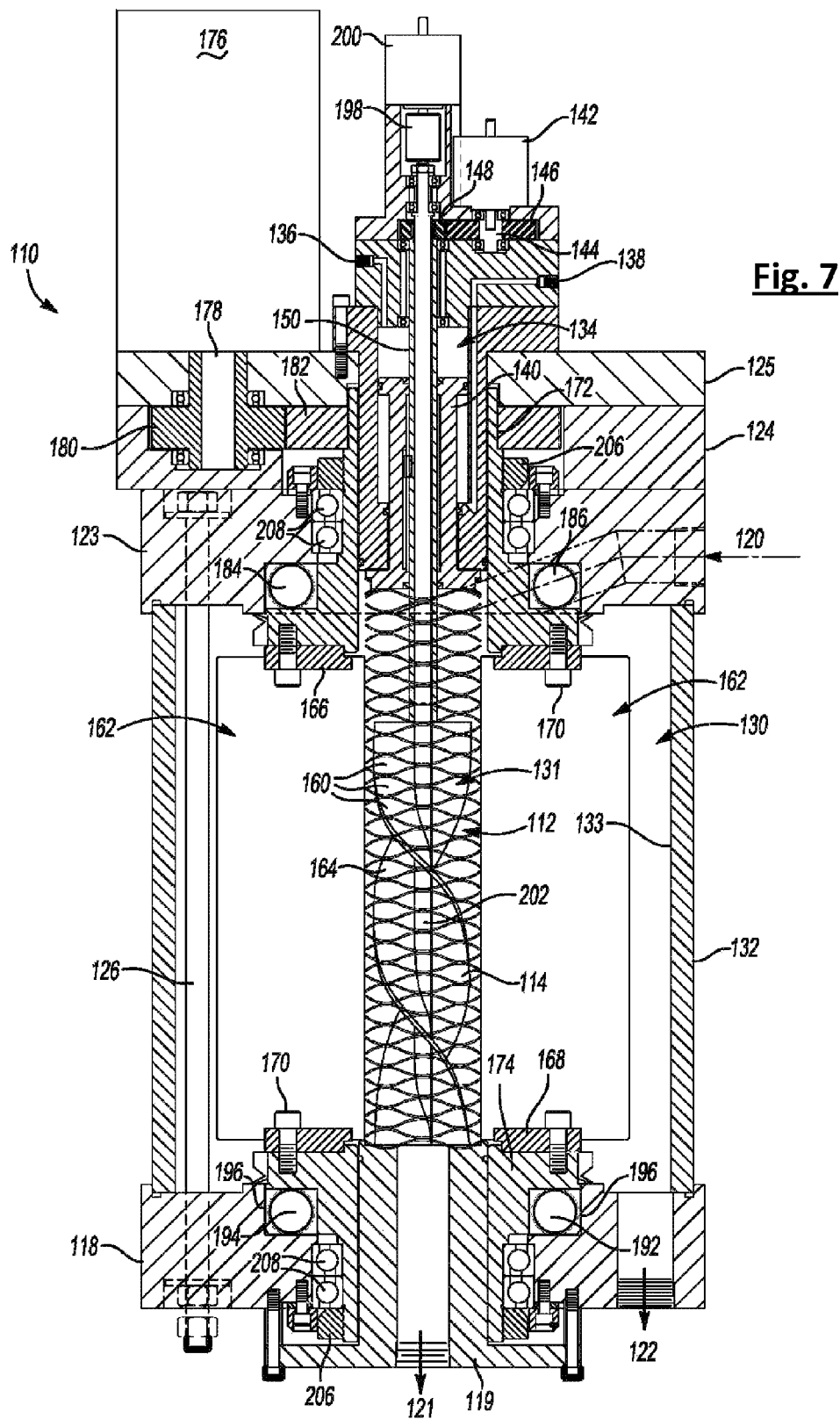
FIG. 7 is a partial side cross-sectional view of a centrifugal filter apparatus of this invention with the helical filter element fully expanded.
Figure 8:
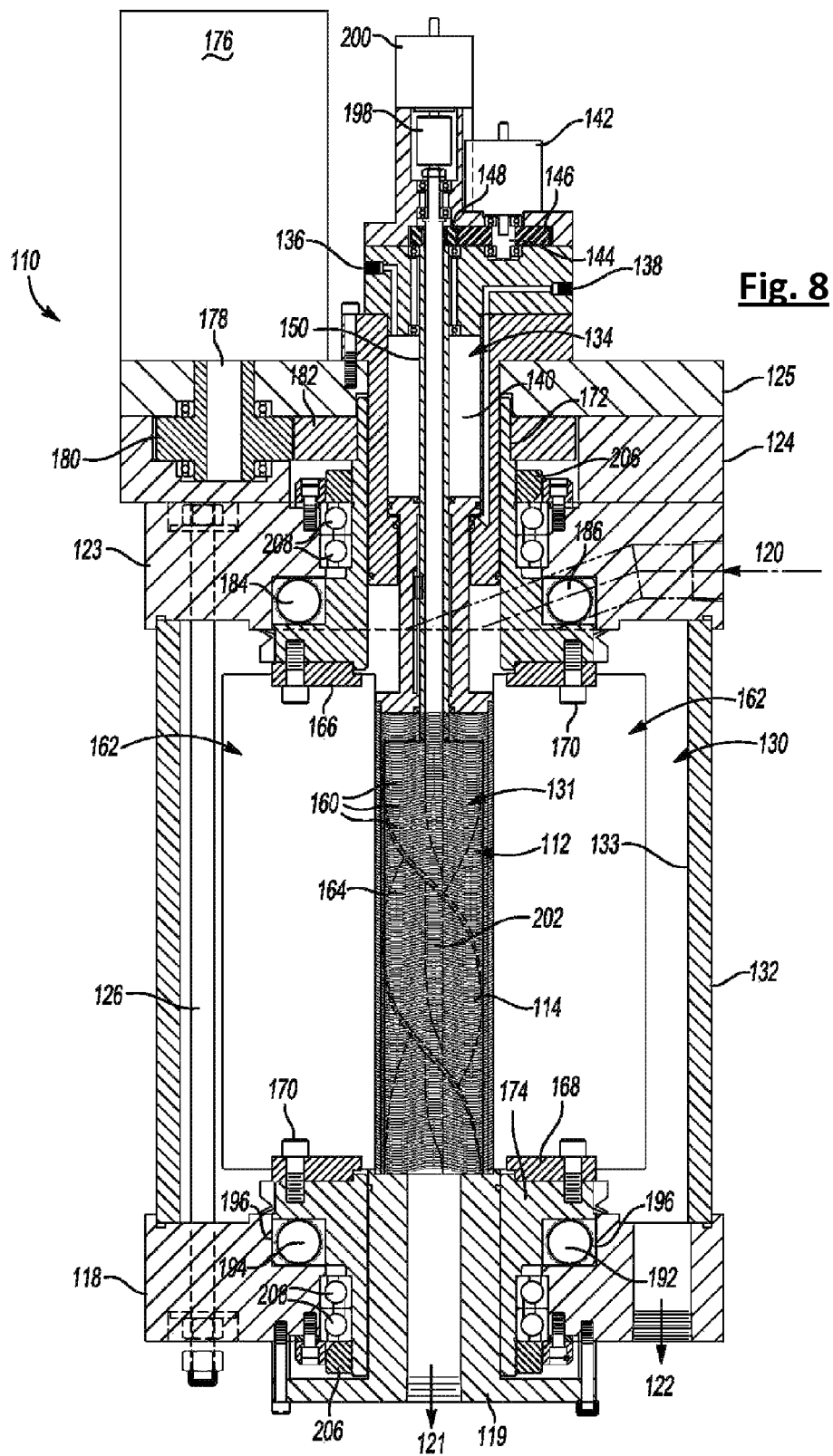
FIG. 8 is a side partially cross-sectioned view of the centrifugal filter apparatus shown in FIG. 7 with the helical filter element fully compressed.
Figure 9:
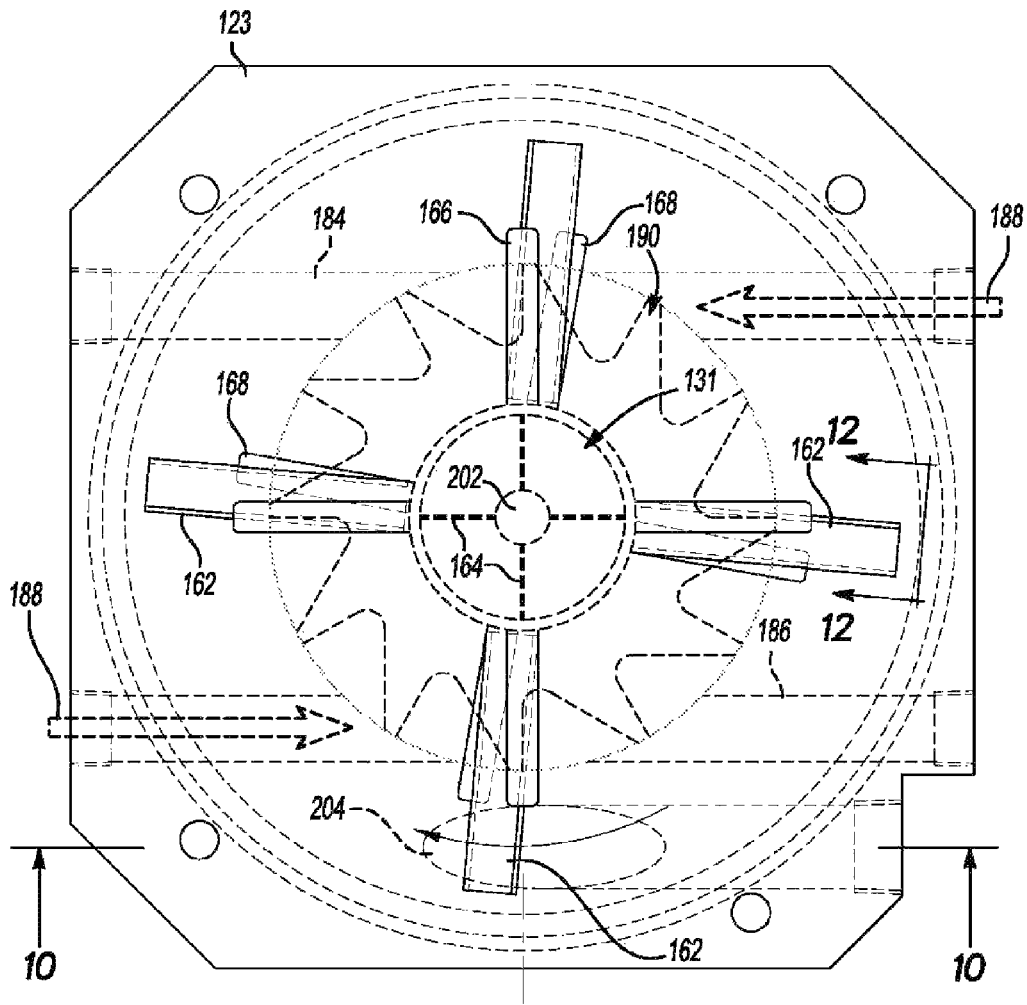
FIG. 9 is a top plan view of the filter assembly shown in FIGS. 7 and 8 with the motors removed.
Figure 11:
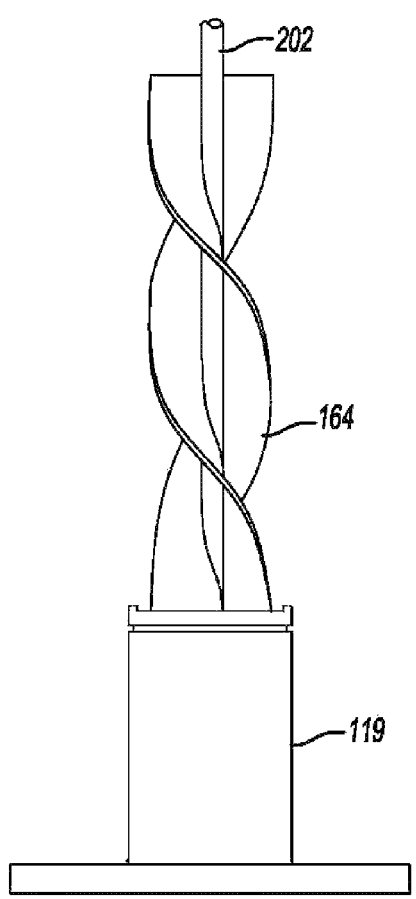
FIG. 11 is a partial side view of the internal radial centrifugal fins.

In the disclosed embodiment of the centrifugal filter apparatus 110 of this invention, the apparatus includes external rotating centrifugal radial fins 162 shown in FIGS. 7 and 8 and internal rotating centrifugal radial fins 164 shown in FIGS. 9 and 11. As described below, the external and internal centrifugal radial fins 162 and 164, respectively, cooperate during filtration and purging of the helical filter element 112 to significantly improve filtering by the filtering apparatus of this invention. In the disclosed embodiment of the centrifugal filter apparatus 110, the external centrifugal radial fins 162 are rigidly supported by upper bracket members 166 and lower bracket members 168 by bolts 170 as shown in FIGS. 7 and 8. The upper bracket member 166 is also rigidly connected by bolts 170 to the upper spindle 172 and the lower bracket members are rigidly connected to the lower spindle member 174 by bolts 170. The upper spindle 172 is rotatably driven by electric motor 176. The drive shaft 178 of the electric motor is fixed to an external drive gear 180, which drives a driven gear 182 fixed to the upper spindle 172. Thus, the electric motor 176 rotatably drives the upper spindle 172 which rotates the external centrifugal radial fins 162 within the outer or first filtration chamber 130.

In the disclosed embodiment of the centrifugal filter apparatus 110, the external centrifugal radial fins 162 are also driven by pneumatic pressure as also shown in FIG. 9. As shown in FIG. 9, the upper housing member 123, which serves as a cover for the filter canister, includes two pneumatic channels 184 and 186, which have a circular cross-section as shown in FIGS. 7 and 8. Air under pressure is injected into the pneumatic channels 184 and 186 in opposite directions as shown by the arrows 188 to turn the turbine blade 190 at the outer surface of the spindle 172 as shown at 190 in FIG. 7. Thus, pneumatic pressure injected through pneumatic ports 184 and 186 rotate the external centrifugal radial fins 162. In the disclosed embodiment, the lower spindle 174 is also pneumatically driven. The lower spindle includes pneumatic channels 192, 194 which drive a turbine 196 as described above with regard to the pneumatic channels 184, 186 and turbine 190.

As will be understood from the above description of the drives for the external centrifugal radial fins 162, the fins may be rotatably driven by the motor 176 or pneumatic pressure injected through pneumatic ports 136 and 138 in the upper spindle 172 and through ports 192 and 194 through the lower spindle 174. As will be understood by those skilled in this art, the motor drive and the pneumatic drives may be used in combination depending upon the type of motor 176 or independently depending upon the conditions. For example, where the waste being filtered by the centrifugal filter apparatus 110 must be continuous, the pneumatic drive may be used as a back-up in the event of an electrical power failure.

In the disclosed embodiment of the centrifugal filter apparatus 110 of this invention, the internal centrifugal radial fins 164 as shown in FIGS. 9 and 11, are rotatably driven by electric motor 198 shown in FIGS. 7 and 8. The motor 198 is supported in a housing 200. The drive shaft of the motor 198 rotatably drives rod 202 and the internal centrifugal radial fins 164 are mounted on the rod 202 as shown in FIG. 9. Thus, the motor 198 rotates the internal centrifugal radial fins 164 independently of the external centrifugal radial fins 162.

Figure 10:
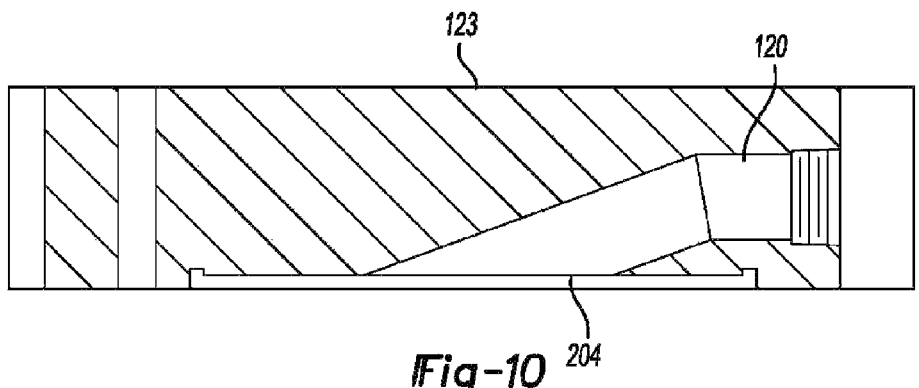
FIG. 10 is a cross-sectional view of FIG. 9 in the direction of view arrows 10-10.
Figure 12:
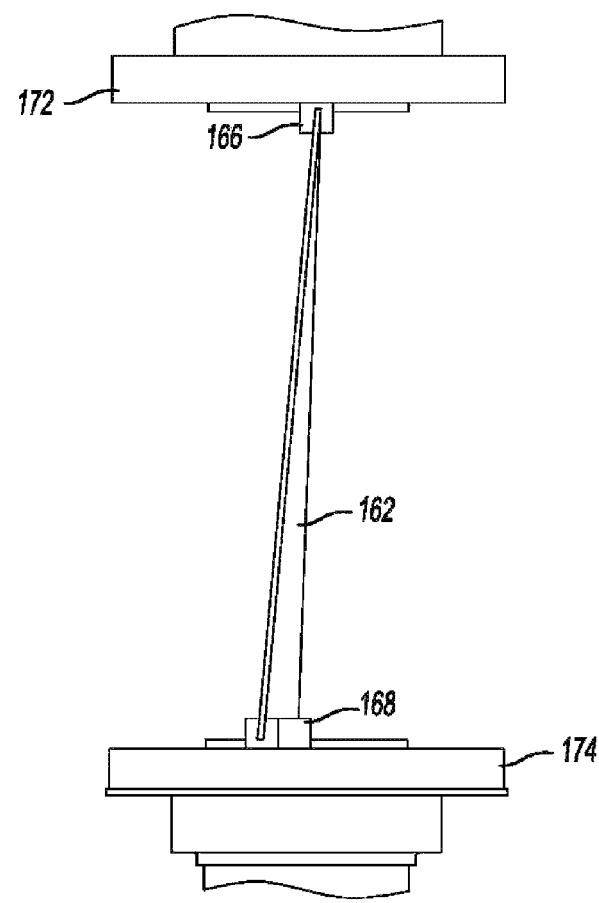
FIG. 12 is a partial side view of FIG. 9 in the direction of view arrows 12-12.

In the disclosed embodiment of the centrifugal filter apparatus 110, both the external and internal centrifugal radial fins 162 and 164, respectively, are canted relative to the axis of rotation of the fins to drive liquid in a predetermined direction. In the disclosed embodiment, the external centrifugal radial fins 162 are pitched or tilted relative to the axis of rotation as best shown in FIG. 12. As will be understood by those skilled in this art, the external centrifugal radial fins 162 may be formed in a spiral or pitch prior to assembly in the filter apparatus 110 or the fins may be planar and pitched during assembly by securing the ends into the upper and lower bracket members 166 and 168 as shown in FIG. 12. The internal centrifugal radial fins 162 in the disclosed embodiment are spiral and secured by welding, brazing, or other methods of attachment to the 202 in a spiral around the rod as shown in FIG. 11. As used herein, the term "canted" includes any tilt or angle, including spiral, generating a radial or axial force on the liquid in a desired direction to improve filtering. To further increase the rotational force on the liquid, the liquid waste is directed through the inlet 120 tangentially into the first annular filtration chamber 130 as also shown in FIGS. 9 and 10. The liquid waste is injected under pressure tangentially through the inlet port 120 into a spiral passage and exits through outlet 204 into the annual first filtration chamber 130 generating an additional centrifugal force.

Having described the basic components of the centrifugal filter apparatus 110, the method of filtration by the filter apparatus will now be understood by those skilled in this art. The liquid to be filtered is injected under pressure into the inlet 120 and the liquid is then directed through the passage in the upper housing member 123 into the annular first filtration chamber 130, tangentially in the disclosed embodiment. The liquid to be filtered is very rapidly rotated in the annular first filtration chamber 130 by rotation of the external centrifugal radial fins 162, driving heavier or denser material in the filtrate radially outwardly under centrifugal force against the cylindrical inner surface 133 of the housing wall 132. The solids are also driven downwardly against the cylindrical inner surface 133 to the solids outlet 122 adjacent the cylindrical inner wall 133. During filtration, the internal centrifugal radial fins 164 are rotated to drive supernatant liquid downwardly toward the outlet 121, drawing liquid through the helical filter element 112 into the second filtration chamber 131, providing a final filter for the liquid waste. As will be understood from the above description of the filtration apparatus 10 in FIGS. 1 to 6, the filter pores 60 between adjacent coils may be adjusted to filter solids of any dimension or size. Further, in this embodiment of the centrifugal filter apparatus 110, much of the filtration is accomplished by the external centrifugal radial fins 162 which drive solids radially outwardly to the solids outlet 122. The helical filter element 112 of the centrifugal filter apparatus 110 of this invention may be easily backwashed quickly by injecting air through pneumatic port 138, raising the piston 140, opening the filter pores and driving backwash liquid through the supernatant outlet 121 and reversing the direction of rotation of the internal centrifugal radial fins 162, driving backwash liquid through the helical filter element and the external radial fins 162 then drive the liquid radially outwardly through the solids outlet 122.

The dual chambered centrifugal and compressive filtration apparatus 110 will separate fluids and suspended solids into components based upon their respective densities by an integrated combination of centrifugal and filtration mechanisms. Incoming fluids containing solids are rotated at selected velocities, for example, 10,000 revolutions per minute, to achieve waste solids liquids separation in the millisecond to second range. This generates G-forces in the 13,000 range in a canister whose radius is 15 cm. Solids separate from suspended fluid in this gravitational field at clearing times proportional to their densities and masses. The suspension introduced at the inlet 120 deposits on the canister inner cylindrical surface 133. Upon clarification, liquid media is forced through the helical filter element 112. Heavy particles will clear quickly into the space between the external centrifugal radial fins 162 and the filter canister's wall 133. It will be noted that the direction of rotation of the external fins 162 corresponds to the direction of flow of the incoming solids and fluid suspension through inlet 120. This parallel flow, where the suspended solids are introduced adjacent the outer surface subjects the dense and more massive particles to maximum G-forces, at the point of greatest radial distance from the center of rotation. The solids dewater and collect at the inner surface 133 of the canister housing, thereafter continuing to rotate downward toward the solids output or exit 122. The aspect ratio cross-section to canister height may vary from 4:20 to 4:1 depending on volume throughput and time sedimentation time requirements. The solids clearing (sedimentation) time (T) is proportional to radial distance from the center of rotation (r), velocity ($v_f$) and density (dm) of fluid medium, particle density ($d_r$), diameter ($D^2$) and a rotational velocity ($RPM^2$). From calculations using $T = r/v_{f\times} D^2 (d_m - d_p)_{\times RPM}^2$, where r and D are in cm., the clearing times for waste particles are calculated to be in the millisecond to second ranges at $10^4$ RPMs, well within the dwell times within this centrifugal filtration device, if the volume is 20 gallons and the flow rate were to be 60 gallons per minute.

As set forth above, the external and internal centrifugal radial fins 162 and 164, respectively, may be canted with pitch values to reduce materials drag at high G-forces and to facilitate uniform radial transport in that field with maximum sheer and solid particulates. As used herein, "canted" includes angle or pitch as shown, for example, by the angled external centrifugal radial fins 162 in FIG. 12 or the fins may be spiral as the internal centrifugal radial fins 164 spirally surround the central drive rod 202. The pitch values may also vary from top to bottom of the canister in a spiral manner, for example, to further reduce shear of incoming solids. The solids introduced at 120 are subjected to centrifugal forces acting on the solids; the suspending fluids, however, are driven by both centripetal (central orienting pressures) forces and negative (pull) pressures exerted by the internal centrifugal radial fins 164. The suspended fluids are thus clarified. The combination rapidly and completely separates solids and liquids, without the use of thickening or flocking chemistries. It is apparent that the internal and external centrifugal radial fins 162 and 164, respectively, along with line pressure force clarified fluids and solids to exit that their respective outlets 121 and 122, respectively. The centrifugal fins simulate a conventional centrifuge head, except that the canister (head equivalent) is stationary and the fluids or solids are in motion. The non-sedimentation solids rotate in a neutral zone surrounding the helical filter 112 to be removed and combined with the solid fraction upon periodic backwash. These sedimented solids exit the canister or housing adjacent the cylindrical inner surface 133 of the canister housing 132 through solids outlet 122.

As will be understood, the centrifugal filter apparatus 110 of this invention may be used to remove microscopic and submicroscopic particles from industrial stack, combination engine exhaust, syngasses generated by gasifiers and valuable machine oils. To extend the range of the filtration to submicroscopic levels, the helical coils 114 may include radial grooves as shown at 64 in FIG. 3 for filtration of submicroscopic particles when the helical filter element 112 is substantially fully closed as shown in FIG. 8. The backwash will take no longer than three seconds and may only infrequently be required due to the continuous removal of essentially all of the suspended solids by the centrifugal action of the external centrifugal radial fins 162. The backwash cycle is either called through computer-activated relays in response to an in-line pressure transducer at the inputs or is routinely set to occur at some time interval. This cycle can be repeated between any pair or number of pairs. The clean fluid diversion for backwash may only require partial diversion of the input from one of its pair where loads are light. In the disclosed embodiment of the centrifugal filter apparatus 110, filtration and driver shaft units are pressure sealed internally with seals 206 as shown in FIGS. 7 and 8. Further, because the external centrifugal radial fins 162 are rotated at very substantial velocities, the spindles bearings 208, such as fully caged brass bearings.

The centrifugal filter apparatus 110 may be used for clarifying used machine or vehicle oils, which are known to contain a wide distribution of metallic, silicone and plastic solids contaminants from millimeter to micron size. Rancid oils also contain colonial bacterial forms with cross-sections exceeding ten microns. Clarification improves the ability of reprocessing plants to recycle such waste products and blend for fuel in electric power plants. Most oils contain polar emulsifying agents to assist waste products and blend for fuel in electric power plants. Most oils contain polar emulsifying agents to assist in the distribution of water and suspensions of additives, such as chlorinated paraffins. These emulsifying water-oil-particulate fractions referred to as micelles, are found to form size-specific cross-sections in the range of 250 microns and 50 microns. The flat wire helical filter element of this invention is found to break up these micelles as a consequence of frictional forces, assisted by heating. The flat wire helical coil filter element 112 breaks the emulsions in three phases, which the centrifugal filter will separate. After a micelle break-up with heat and passage through the helical filter element 112, the micelle cracks, releasing contained water, polar emulsifying agents, particulates, chlorinated paraffin, which all separate from useful oil in the centrifugal filter apparatus of this invention by a three-phase split.

The centrifugal filter apparatus 110 of this invention may also be combined with ancillary equipment for further clarification of the liquid and drying of the solids. For example, the liquid or supernatant outlet 121 of the filter canister may be directed to a chelating or ion exchange adsorbent column to remove soluble (waste) chemicals. The liquid supernatant may be passed through a resin column, further purifying the liquid. To achieve further drying and sterilization of the solids exiting the filtration apparatus through solids outlet 122, the partially dry solids may be directed into a filter press having a piston compression, for example, wherein the partially dried solids are heated and compressed depending upon the application.

As set forth above, various modifications may be made to the filter apparatus of this invention within the purview of the appended claims. For example, various drives may be used to rotate the external and internal centrifugal radial fins 162 and 164, including various types of motors and drive chains or belts. Although the disclosed embodiment of the centrifugal filter apparatus includes a helical filter element 112, in certain applications other more conventional annular filters may be used. The shape of the filter canister may be modified, as will be noted below, but in the above embodiment the preferred internal surface 133 is cylindrical. Further, although the filter drive preferably includes both a pneumatic piston drive and a rotational drive to open and close the filter pores, the filter drive may only include one of the described filter drives. Further, although the external and internal centrifugal radial fins are preferably canted as described, the fins may also be planar and perpendicular to the axis of rotation, and helical 164 or conical helical or isosceles trapezoidal 262 in shape.

The embodiment of this filter apparatus 210 illustrated in FIGS. 13 to 22 may be characterized as a conical centrifugal filter apparatus or more specifically a dual-chambered centrifugal device and with appended compressive filtration elements for separating and drying waste solids from fluids and purifying or refining fluid filtrates. This includes separating and purifying, for example, waste oils and water, as well as bio-fuels that may be generated within a modification of the centrifugal filter. The elements of the centrifugal filter apparatus 210 are numbered where appropriate in the same sequence as the filter apparatus 100 described above, but in the 200 series to reduce the requirement for a detailed description of like components. The disclosed embodiment of the filter apparatus 210 includes a central annular filter element 212 which, in the disclosed embodiment, is a continuous flexible resilient generally cylindrical helical coil, as noted above, including a plurality of interconnected generally circular helical coils as described above with reference to the filler element 12. However, the centrifugal filter apparatus of this embodiment this invention may alternatively include any conventional annular generally cylindrical filter element although the helical filter element as employed in 212 is preferred in many applications.

The filter apparatus 210, in FIG. 13, includes an upper housing member containing an inlet 220, a supernatant outlet 211 and a solids outlet 222. The disclosed embodiment of the filter apparatus 210 further includes upper 243 and lower 242 housing members which retain, by means of retention posts, the double walled canister 232 and its inner cone-shaped liner 216, between which is an evacuated jacket 217. The inner housing member 216, being cone shaped, allows the spinning fluids entering 220 to spiral at increasing velocities toward the base and outlet 222. This increase in angular velocity within the cone 216, and the momentum imparted upon the suspended particulates, is a well known pseudo-vector quantity with direction and magnitude, i.e., (mass×velocity) perpendicular to the pseudo-gravitation force which is (mass×gravity). This pseudo quantity is illustrated by the right hand rule (so called Coriolis force) in which, as the fingers pointed in the direction of the motor's 276 spin, the thumb points in the force direction, toward the base of the centrifugal cone. The motor 276 and drive shaft coupling 275, perform work on the suspended particulates equivalent to 0.5 mv$^2$, which increases as velocity increases as momentum is conserved toward the bottom of the cone. The clockwise momentum conserving force also stabilizes the spinning cone, as in a gyroscope. This is distinctly different from the classical centrifuge head, where slight variations in radial loading can generate wobble due to torque imbalance. The disclosed embodiment includes a first annular filtration chamber 262 surrounding the annular filter element 212 and a second filtration chamber 231 within the annular filter element 212 as further described below. The first filtration chamber consists of the cylindrical housing wall 232 defining a cylindrical inner surface 233, the inner cone shaped lining 216 and the free space separating the two walls 217. This free space 217 and the cone shaped inner lining 216 provide the first chamber with its unique physical principal of materials separation, as well as means to heat or cool the camber's contents during operation within ranges between thermolytic 1500° F. and cryogenic at or below 238° F. In the centrifugal filter apparatus 210 of this invention, the internal wall 233 of the canister housing is preferably cone shaped to accommodate the cone fitting isosceles trapezoidal centrifugal fins 262 described below.

In the disclosed embodiment FIG. 14 of the centrifugal filter apparatus 210, the external centrifugal radial fins 262 are rigidly supported by upper and lower bracket members 272. These brackets are either welded or bolted to a rigid rail 270, to which the fins 262 are bolted or welded. This bracket and rail assembly, if bolted, allows for horizontal pitch adjustment, with the bolts being set screw adjusted along supporting slots in the vertical rail, as shown in FIG. 14. The lower spindle member 274 is also rigidly bolted or welded to the motor 276 drive coupling 213. The upper bracket member 272, if not welded as one piece to the guide rail 270, may ride on bearings 208 with isolating seals 206, which permits the aperture adjustment mechanism 209 and 219 to remain stationary through this rotary bearing and seal coupling assembly. This rotary coupling assembly is essential, when it becomes necessary to adjust the filter's aperture during operation, without interrupting the centrifugal spin. The lower spindle 274 is rotatably driven by electric motor 276. The drive shaft 275 of the electric motor is fixed to the motor drive by a coupling 213, which rotates the lower spindle 274, which rides on a set of bearings 208, with its isolating high pressure-low friction seal 206. Thus, the electric motor 276 rotatably drives the upper and lower bracket spindle 272 which rotates the external centrifugal radial fins 262 within the outer or first filtration chamber 233.

In one preferred embodiment FIG. 15, the helical filter element 212 includes both a first pneumatic filter drive 221, with its adjustable stroke set screw 273, compressing or expanding the helical filter element and a second internal drive 209, with its Acme nut 220 which rotates a piston 270, which is pressure fitted inside the filter 212, which, upon rotation either clockwise or counter-clockwise, moves one or more of the helical coils into and out of registry for very accurately controlling the volume of the filter pores between adjacent helical coils, as noted in FIG. 7 and FIG. 8. In the disclosed embodiment, specifically FIG. 15, the first drive 221 is a through hole pneumatic drive, wherein pneumatic pressure received through inlet pneumatic port 221 drives the piston 218 in FIG. 13 downwardly as, in FIG. 7, to compress the helical filter element 212. Alternatively, this first drive may be hydraulic. An advantage of a pneumatic filter drive 221 is that the compression on the helical filter element 212 may be released quickly and precisely during purging by filling the pneumatic cylinder 275 and opening the filter to a gap distance 219 adjusted by a set screw 273. By reversing the pneumatic pressure at 221, the filter closes to a predetermined aperture size 219. Accurate control of the volume of the filter pores, as noted in FIG. 8, in this embodiment is controlled by the second drive 209 which, in the disclosed embodiment, is a stepper motor. The stepper motor will depress the drive shaft 223, which is coupled to the drive piston 270 through the acme nut 220. This stepper drive, with its tubular drive shaft 223 connected to the upper end of the helical filter element at 212, both brings the spiral coils into register and sets the maximum aperture opening for backwash. The pneumatic through hole drive 221 piston instantaneously opens and closes the filter, to levels preset electronically by the stepper motor 209. The stepper motor 209, through its coupling drive shaft to the piston 218 inserted into the bottom of the filter 212, sets the preferred aperture of the filter during its filtration cycle.

The solids output 222 in FIG. 13 is preferably controlled by a time regulated valve 231 included in FIGS. 16, 17, 18. These solid residues flow under pressure into the core of a drying filter 234, FIG. 18, where the filter element is the same spiral type 212 as employed in numerous other applications, including the centrifugal filter noted in FIG. 13. The drying filter functions as a filter press, when the spun dry solids from 222 are flowed under pressure from the centrifugal filter through the valve 231. The filter's apertures are operated 219, 221, by the pneumatic mechanism described in FIG. 15, while the retained solids are being compressed pneumatically by a compressor introducing compressed air through the in line inlet 229. The apertures allow free liquids to exit from the filter into a enclosing drain tube 232 and thereafter out the drain outlet 230. Additional free water from the solids, retained inside the filter, may be removed by injecting hot air from the compressor, thus vaporizing bound fluids from solids to achieve higher levels of dryness, typically between 50% and 100%, for example, from animal wastes which may retain 50% moisture after filter pressing alone with ambient air. Self cleaning of the filter press element is done by injecting compressed air or fluid through 233, which forces particulates adhering to the inner surface of the filter 212 through the filter press outlet 279, upon opening of the outlet valve 232. A pneumatic drive 221, as illustrated in FIG. 15, may be activated to open and close the filter during this self cleaning backwash of this filter press. The dry solids plug retained within 212, and backwashed 233 solids, are both expressed under pressure through the discharge valve 232.

The backwashing mechanism for the centrifugal filter 210 of FIG. 13 is further illustrated in three dimensional embodiments of FIGS. 16 and 17. In this context, there is described means to remove dissolved solids from fluids, including oil and water. The three way valve 235, in FIG. 16, is closed to prevent filtrate throughput, but open to backwash through 228. Either the discharge filtrate 234 from the drying filter press 234 or clean fluids from an external source may be flowed back through the filter's core 212 through 228. Backwashing fluid flows through the apertures, thereby freeing solids retained by the filter into the external chamber 223. Following a high speed spin of the centrifugal filter in FIG. 17, the suspended solids pellet as in 224, and, with the three way solids exit valve 231 open, the solids exit the centrifugal filter into the solids drying filter 234. Following this backwash cycle, a new batch of suspended solids and fluid is fed back into the centrifugal filter in FIG. 16 through input 227, where a spin, backwash and dry cycles are repeated.

In FIGS. 13 and 18 the solids as described accumulate in a stabilized dry form, but the filtrate 230 remains contaminated with dissolved solids. This contamination is partially remedied through installation of a manifold input 227 with reagent metering ports 225, 226. Organic and inorganic phosphates, for example, are rendered insoluble upon the addition of as lime through one of the metering ports. The then suspended solid precipitate entering the centrifugal spin chamber 223 separates and pellets together with other incoming suspended particulates 224. Thus, both suspended and the dissolved solid precipitate exit 222 to the dryer 234.

It will be understood from the above that the centrifugal filter and filter press, metered feeds, air compressors, motor and valves will be combined in closed system under computer control. The motor 276 determines rotational velocity, rpm, of suspended solids within the chamber 223. Clearing time to pellet 224 is largely proportional to the square of the rpm and cross sectional mass of the suspended particulates. The Coriolis momentum vector, as noted above, and forces so generated force particulates to process toward the base of the cone toward the output collection port 222. However, at 50 rpm and below, for example, suspended solids 223 in the outer chamber do not settle as a pellet 224, because centrifugal and centripetal and buoyancy forces will approximately balance. Taking advantage of this mixing feature, suspended particulates introduced at 227 may instead be selective adsorbents solids or resins 223 as in FIG. 16, not solid contaminants. These adsorbent solids 223 are illustrated as model organic nano-polymers bound together through silicon 236 and other binding complexes 238 to a support base 239, The selective adsorbent ends 237, 240 are nitrogen based; these 237,240 functional groups are chelating ligands. These chelates capture specific metals or organic compounds from solutions based on a combination of molecular shape and size as well as coordinate covalent bond and electrostatic affinities, whereas ion exchange resins rely on electrostatic interactions alone. In this specific chelating resin, the ligands may either be tuned acidic 238 or basic 240 as needed to capture anions or cations. The Lewis acids 237 ($^{(-)}NH_2$) or bases 240 ($^{(+)}NH_3$) selects for cationic metals and anionic organic, respectively. For example, cobalt and nickel in cobalt mining facilities are both extracted from ore as cyanide complexes, where the chelating resin selectively separates the cobalt from nickel and cyanide anions; the cobalt-resin complex is broken with alkali and the metal hydroxide separated and refined by conventional smelting to generate metallic cobalt. Many other precious and semiprecious metals, including lanthanides and rare earth used in the electronic industries, are similarly derived by heap leaching (extraction) from low grade ores. In the current embodiment 210, FIG. 16, the chelating resins mix 223 in the outer chamber at rotor mixing speeds less than 50 rpm in the process of selectively capturing the metal, which occurs rapidly within seconds. However, at speeds up to 500 rpm, the resins with their captured metal pellet on the walls toward the base of the cone 224 in FIG. 17, with the suspending fluid and unwanted waste solutes exiting through the filter 212 and the filtrate output port 228. This selective chelation, occurring within seconds, is a first order reaction, i.e., the metal with the greater affinity constant binds immediately in a non-competitive reaction. This immediate bonding and removal of metals competing for binding sites is significant, given that there are no interfering liquid-solids or competitive exchange reactions to complicate the adsorption process, as is the case in ordinary fixed or fluidized bed adsorption columns. Next, the solutes so loaded onto the adsorbent are desorbed with a decoupling agent, such as an alkali, which is metered in line at 225. This de-coupling reagent re-suspends the resin, as in 223, and simultaneously displaces the captures solutes from the resin. This frees the solutes, for example, the metal, into solution again. A third high speed spin re-pelletizes the resin 224, with the solutes separating through the filter 212 and output port 228, where solutes, for example, metal hydroxide, may be concentrated and processed to industrial grade. Such processing was noted above for cobalt, but other chemical means are common. These means may also use the centrifugal technology described herein to sequester valuable chemicals and discard contaminants. This decoupling reaction with alkali leaves the resin in the basic form 240; re-suspension by addition of a neutralizing acid 226 restores the active acidic binding form of the affinity resin 240, which, upon being pelleted dry 224, is ready for reloading with dissolved solids solutions through 227. It will be noted here that the chelating resin, a dendritic nano-polymer 238 may be coupled to a support matrix 239 through a binding complex 241; this resin may be designed with chelation sites in the form of rings 244 which trap or sequester solutes with highest affinity, based on bonding and stereo-specific properties. All functions of the centrifugal filter, including valves 235, metering devices 225. 226, filter apertures 212 and motor drive speeds are under computer control such that the suspension and dry cycles are preset. It is particularly to be understood that the pneumatic aperture adjustment mechanism described 219, in FIG. 15, is closed during mixing and open during spin cycles. This dissolved solid recovery applies to both aqueous and oil based fluids; contaminants may be removed from machine oil during recycling, precious metals such as gold sequestered from low grade ore. Mercury and arsenic compounds have been separated from contaminated industrial fluids by sequential steps to non detect, parts per billion, levels to generate potable water using these resins.

In another embodiment of 210, FIGS. 16 and 17 of the centrifugal filter, including particularly the external valves 235, 231 and corresponding output ports 228 and 222, vibrating densitometers or viscometers are inserted in line with these valves. These monitor the physical properties of fluids at the output points. Separating, for example, water and oil and suspended solids, is frequently desirable, in order to recover and recycle lubricants or fuels or drilling muds or machine grinding swarf. At a constant flow 227 of such immiscible liquids into the centrifugal chamber 223, the more dense water and solids separate in a wedge along the walls and toward the bottom of the chamber 224, while the oil collects in a cylinder around the cylindrical filter core 212. The Coriolis momentum forces the heavier fluids and suspended solids into the wedge 224, where the spacer 236 prevents the wedged fluids and solids from entering the filter space 212. Feedback from the densitometer or viscometer combinations at 235 and 231 regulate valve openings at the two exit points simultaneously, allowing only oily liquids through 228 and watery through 222. The drying filter 234 is set at apertures to remove suspended solids from the watery output. If the densitometer, for example, detects a change in fluid density of oil at 228, indicative of a watery contaminant, the valve at 231 is marginally further opened to increase the flow of water from 222. In this manner, compensating and balancing valve response performs a three phase separation of the water and solids from immiscible oily fluids. While these valve are operating in feedback mode, the rotating centrifugal radial fins 262 operate at speeds in excess of 500 rpm to maintain the phase separations, where the water and solids occupy the cone wedge on the chamber wall 224 and the oil conforms to a cylinder surrounding the filter's cylinder 212, but in its own phase during transport across the filter. It is important to here note that the flat wire filter apertures shown in FIG. 3 are adjustable to break water and fine particulates emulsified in oil, or alternately, a similar suspension in water. These suspensions form micells on the order of 250 microns surrounding core particulates or smaller, largely water, oil and emulsifying agents at approximately 45 microns; passage through the flat wire filter at 25 microns removes particulates and water, while breaking the otherwise stable micelle and releasing the oil for purification through the filter 212. Emulsifying agents are additives to machine oil, but are found naturally in crude oil; their removal before recycling or refining in this manner may substantially reduce processing costs.

Figure 19:
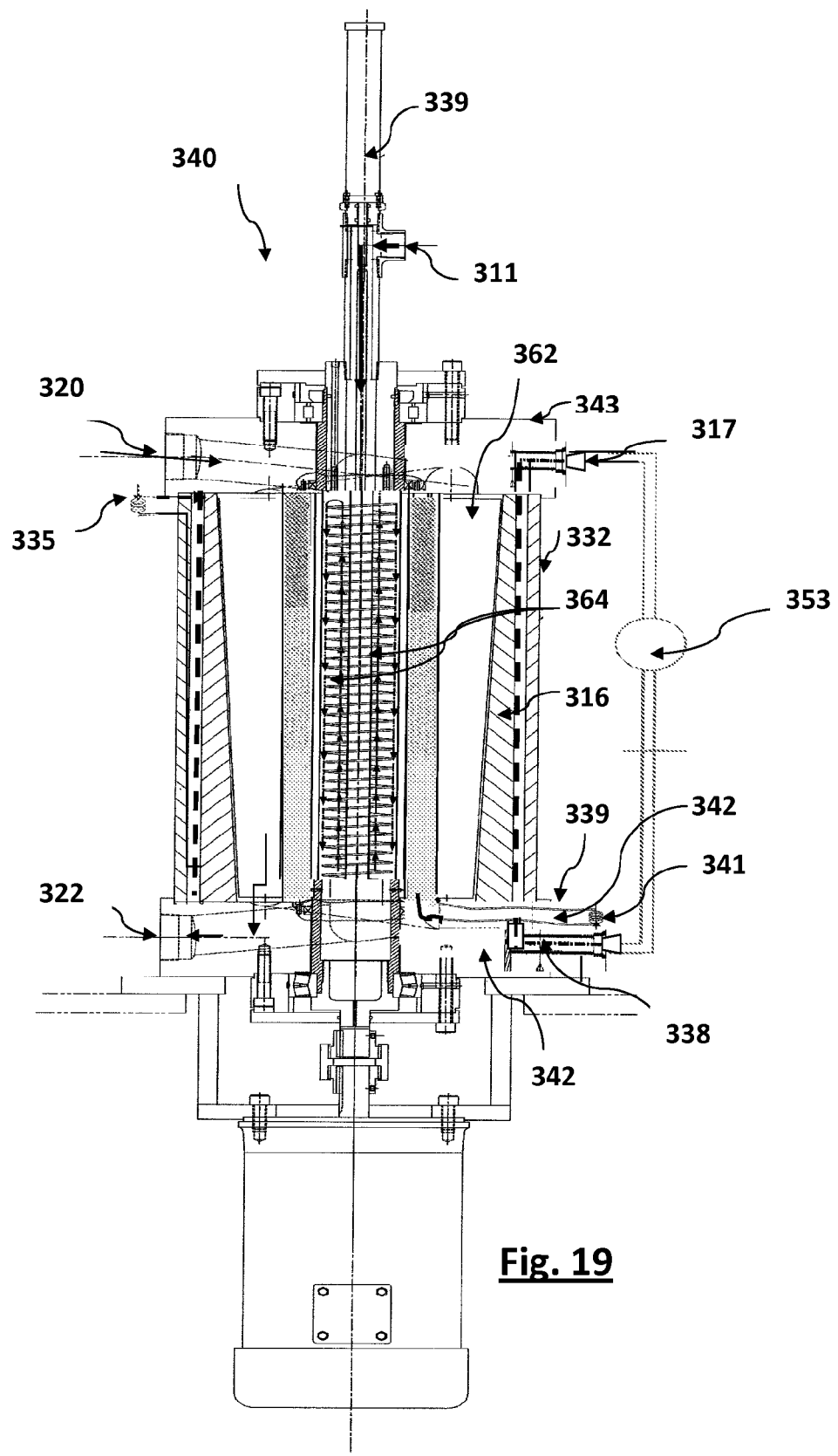
FIG. 19 is a partial cross-sectional side view of the centrifugal filter, as in FIGS. 7, 8, 11 having internal and external fins in cylindrical format, with a double-walled canister and dual filters in a nested configuration separated by an electrolyte.
Figure 20:
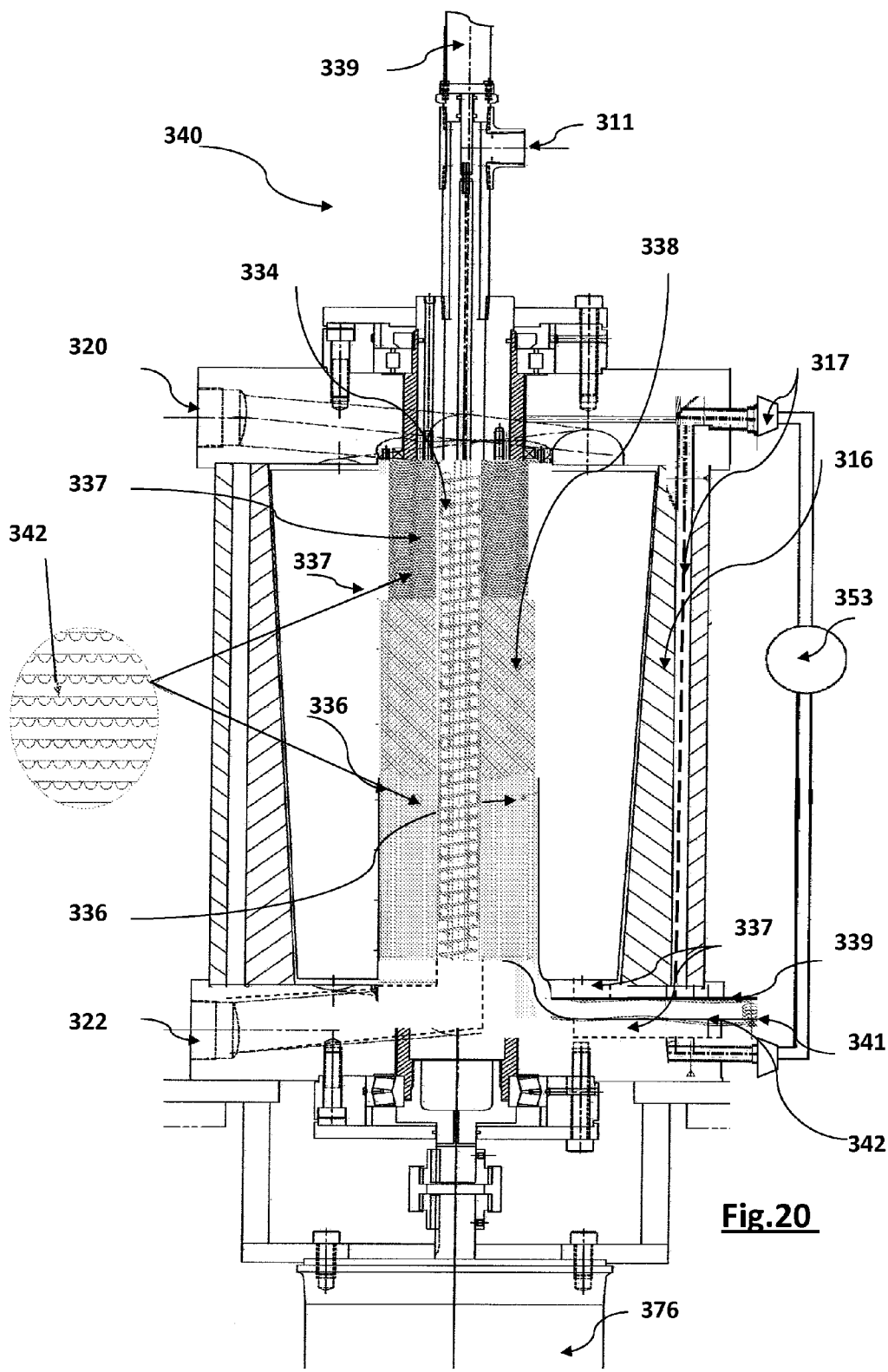
FIG. 20 is a partial cross-sectional view of the centrifugal filter showing the dual nested filters in a fuel cell format.

In yet another embodiment 340, FIGS. 19 and 20, the external and internal centrifugal radial fins 362 and 364, respectively, cooperate during the operation of a fuel cell, fabricated from filter coils as in FIG. 3. These fins facilitate delivery of oxygen to the cathodic side and fuel gasses over the anode. The internal 362 and external 364 compartments are separated by a matched set of helical coils which constitute anode and cathode. This set is a concentric filter core separated by an active spacer element. This application is a nested configuration, FIG. 20, 336, 337 wherein the external member 336 functions as an anode and the internal member 337 is a cathode. Separating the two is an active spacer, a solid electrolyte 338. The nested filter application ionizes oxygen pumped into 311 the cathodic chamber 364 and metered out 338. The oxygen is actively transported through the electrolyte spacer 338, driven by the potential difference between cathode and anode. Ionized oxygen thus transported to the anode 336 is reduced by one of several possible hydrogen sources. This source may include hydrogen stripped from a hydrocarbon being fed continuously 320 through the input port, with products ($CO_2$ and $H_2O$) metered out the base port 322. The electrodes are coupled through two contacts 339 from the anode and 342 to the cathode from to an external motor 341 or electric power grid. It will be noted 335 that the anodic chamber 362 is heated resistively, although and external heat source, as in FIG. 13, 217, may be flowed through the space 317 between the canister wall 332 and inner wall 316. A slow, 50 rpm, rotation of the fins in the anodic chamber 362 maintains heat transport from source 316 to incoming fuel. The anodic 362 chamber and fins may be cylindrical as in FIG. 19 or, preferably, conical as in FIG. 15. The fins will alternate between slow mixing 50 rpm and high speed spin 500 rpm to meter products out the exhaust 322 and its valve 338 as feedback from in line sensors at 338 require. The conical form as indicated in FIG. 13 is preferable, since downward Cariolis pressure will force products toward the bottom of the chamber or exhaust. The height to diameter ration of the anodic chamber 362 is not represented in FIG. 19; this ratio will be adjusted in fabrication to meet the column requirements for reducing (i.e., $H_2$, CO or other) fuel input 320 and product output 322 kinetics. Kinetics will depend upon the fuel source and voltage difference between anode and cathode. It will be understood that a metal oxide filter external to 322 exhaust and its valve may be added to remove $CO_2$ and $H_2O$ products from reactant fuels, such that un-reacted and unused fuels may be recycled into the anodic chamber 362 through 320.

It is a further property of the centrifugal filter and its nested fuel cell configuration, that the filter coils 64, in FIG. 3, are laser or photo-chemically etched to a depth in the submicron level. When these coils are out of register 60, in FIG. 4, they enclose aperture spaces in the micron range. The arrangement of laser etched ridges 342, FIG. 20, are illustrated in expanded view, wherein the ridges or micron spaces retain anodic 336 and cathodic 337 pastes applied between the coils. These electrically conductive coils are formed from inconel steel, which are either largely nickel as cathode or nickel with substantial iron as anode. The cathode's free space is filled with a nickel oxide paste, while paste in the anode's free space contains ferrites. The coils are thus matched with catalytic ceramic pastes, such that they may be fused (fired) at temperatures between 1200° C. and 1300° C. without separating or thermal cracking. The electrolyte spacer 238 is formed from a stabilized zirconium tape, which is a conducting electrolytic sheet transporting the oxygen anion from cathode to anode. When this tri-laminate 336, 338, 337 combination is fused, they form a compatible high temperature operating solid oxide fuel cell. Stabilized zirconium electrolytes tape is wrapped tightly around the central cathode 337, with a diameter just slightly smaller than the anode 336, and closely fitted surrounding it. The fuel cell tri-laminate is tightly fitted into its sealed base 342 and header 343 support pieces. It may be noted that the relative location of anode and cathode as shown may be reversed with minor changes in fuel and product transport.

Figure 21:
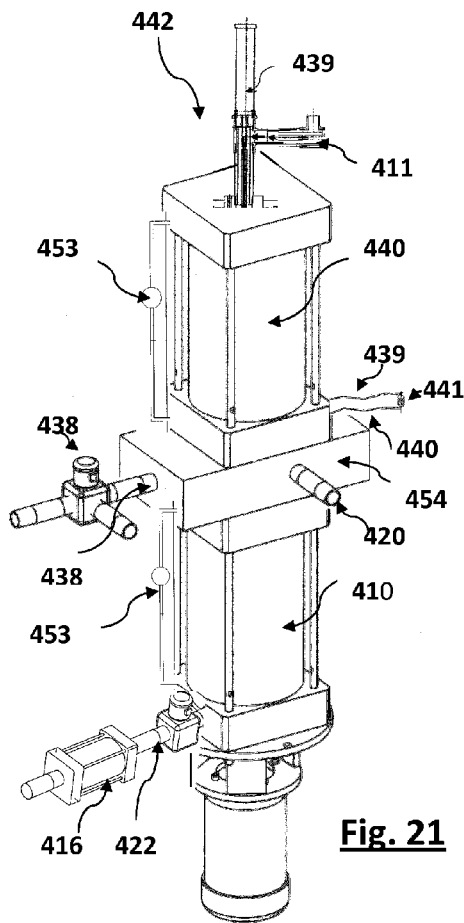
FIG. 21 is a partial 3 dimensional view of stacked centrifugal filters, as in FIGS. 15 and 16, joined by a flange enabling biofuels generated in the first element to be transmitted to the second, electric power generating fuel cell.

In another embodiment 442, FIG. 21, the hydrocarbon fuels generating rector column of FIG. 13 and the fuel cell 340 of FIG. 20 electric power generation functions can be combined as illustrated in FIG. 21. The fuel cell column 440 is stacked above a hydrocarbon generator 410 and coupled through a common flange 454. The column 410 may, as noted, generate several fuels including hydrocarbons through flash pyrolysis or carbon monoxide and hydrogen from gasification or hydrogen by hydrolysis. Fuels, when introduced from the fuels generator 410 through a one way valves in the flange 454, may be consumed directly for electric power generation in the fuel cell 440. Both the fuel cell and the fuels generator operate in the same range between 1200° and 1400° F., such that heat from the fuels generator may be used to sustain the solid oxide fuel cell operation. This stacking configuration is the preferred means, although series coupling as may be inferred from FIGS. 16 and 17, to guarantee first order kinetics (i.e., reactants proceed directly to products without undergoing secondary reactions or back reactions). To achieve first order kinetics and generate a high yield of hydrocarbons, without coke and other complex by-products, the first formed hydrocarbons products must be removed and condensed in seconds, which justifies stacking or similar linkage of reactors as shown in FIG. 21. Provision for heating 416 and condensation 417 within the centrifugal filter was noted above in FIG. 13; this function is also allowed in the stacked version, FIG. 21, by means of an external heat or coolant fluid source 453 circulating hot or cold fluids through the jacket as in 417, FIG. 13. In FIG. 21, as shown in detail in FIGS. 19 and 20, 339 drives the helical fin 364 that transports oxygen 311 to the cathode 337 through exhaust 338 with a metering valve. In FIG. 21, power is being drawn from the fuel cell 440 circuit through 441. The fuel cell is coupled to the fuel generating column 410 through the flange 454; bio-solids are fed into 410 through 420, where pyrolysis or gasification or hydrolysis occurs at high temperatures sustained through a heat source or resistively. The by-products are removed through 422, its valve and collector 416. It is important to note that this stacked configuration, with its ports and valves, external heating or cooling sources may be used also to generate fuel gasses in 410, using 440 as a condenser, not a fuel cell. An alternative is a three stacked unit, coupled with two flanges, where 410 is fuel gas generating, 440 is a deoxygenating catalyst column to convert bio-oil vapor to improved hydrocarbon, with a third stacked unit (not shown) as condenser or fuel cell. Each of these elements and their alternative combinations are interchangeable, based on which customized products are required.

Figure 22:
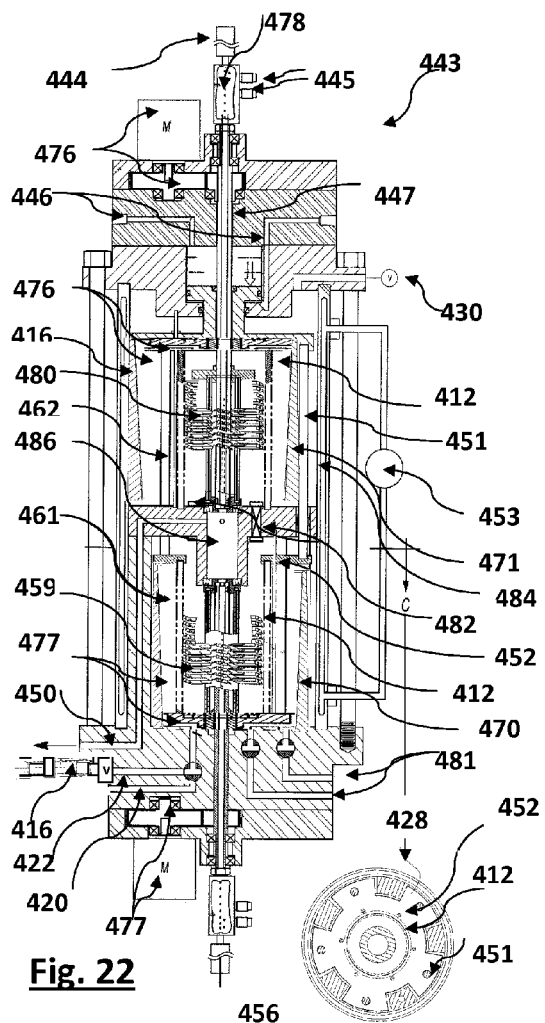
FIG. 22 is a partial cross-sectional view of stacked centrifugal filters, wherein the internal radial fins of FIG. 18 are multiple blade-fins are coupled to a multiport column for recirculation of cold or hot fluids.
Figure 23:
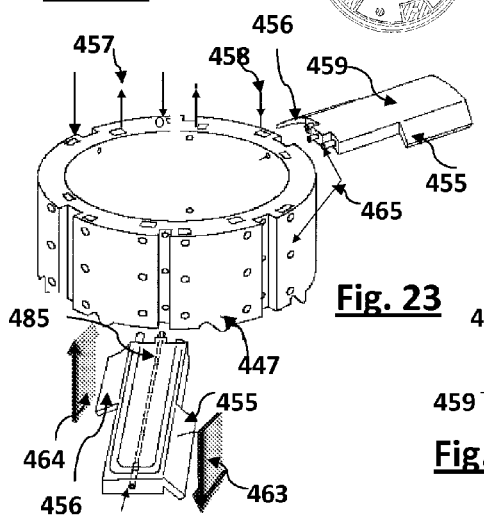
FIG. 23 is a partial 3 dimensional view of the re-circulating blade-fins showing their coupling to the extruded multiport column.
Figure 24:
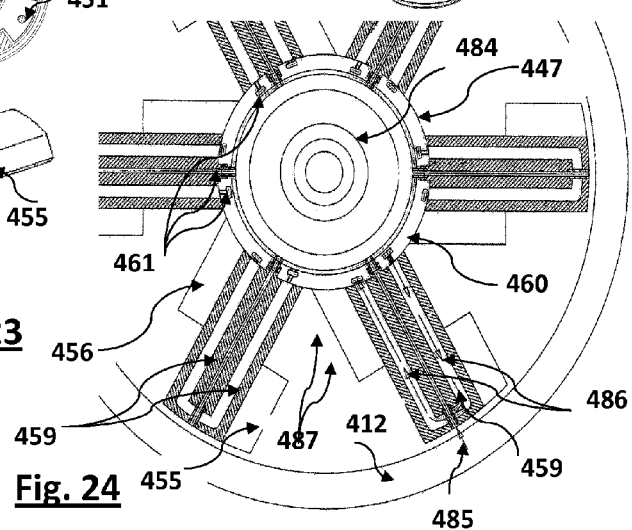
FIG. 24 is a cross-sectional view of the multiport column with snap-on blade-fin assemblies internal to the centrifugal filter.

In a similar embodiment, FIGS. 22, 23, 24 include a stacked set of centrifugal conical filters, but using the electronic drive mechanisms 476, 477 and pneumatic through-hole aperture adjustment drives 446, as described in detail, above, in FIGS. 7 and 8. The drive mechanisms 476 and 477, with their gearing, is both coupled to a set of internal chambered fins 480, 459 and external centrifugal fins 476, 477, such that both the external and internal fins rotate at velocities set by their respective drive motors 476, 477. The external fins 476 rotate within frusto-conical chamber surfaces. The central helical fin 164 in FIGS. 7 and 8, in the present embodiment 459 and 480 in FIGS. 22, 23, 24, is replaced with a radial set of fins attached to a hollow drive 447. The drive is hollow to accommodate fluids flow from a heat torch 444 or refrigerant fluid circulation 445 through a rotary coupling 478 to the core 447 of the drive shaft, also shown in cross section in FIG. 24. The filter 412, FIG. 22, in the top-most chamber 462 is driven by the piston 411, which opens for backwash and closes to a pre-set aperture in response to the through-hole drives 446. The drive shaft 451 extends from the piston 411 to a second disc 452 into which a second filter 412 located in the bottom-most chamber 461. These 462, 461 cooperative mechanisms allow the pneumatic drive 446 to regulate the apertures of both chambers filters simultaneously. It will be noted that the drive motor 476 rotates the set of fins 480 in top chamber 462 independently of the motor 477 driving the set 459 in the bottom chamber 461. Correspondingly, the rotary coupling 478, heat 444 and cooling fluids 445 inputs that service the top chamber 462 are duplicated by an identical set servicing the bottom chamber, adjacent the drive 477. This combination of stacked chambers, with separate drives 476, 477 and fin sets 459, 480 along with heating and cooling sources 444, 445 circulated independently through the fin sets provide unique cooperative properties to the stacked chambers as noted below.

These cooperative properties are further shown in FIGS. 23 and 24. In cross section, the hollow drive 447 contains a core shaft propelled independently by the motors 476, 477. As is apparent in FIG. 23, the hollow shaft 447 is a multiport column to support circulation of hot or cold fluids from external sources 444 and 445, as indicated by the direction of the arrows 458 and 457, toward and away from the fins 459. There are three multiport coupling points 465 in FIG. 23, indicated in cross section 461, FIG. 24. Of equal significance are the central blade 459 and wings 456 proximal to the multiport column and 455 distal from the column. As the column is rotated clockwise by the central drive shaft 484 within 447, the fluids within the filter 412 are transported 456 as shown by the arrow's direction up 454 the column (north), while the fluids are simultaneously carried down 462 the column by the other set of wings 455, in a split stream manner. It will be apparent that a baffle would be installed between blade sets 459 to insure non-mixing of fluids in their transport up and down the column. Also indicated by arrows in the blade 459 of the fin set is the direction of transport 486 to and from the multiport column's contact points 461 through which circulation occurs between the fins 459 and the external heat or cold sources 244, 445. It will also be apparent that circulation 486 may be extended into and out of the wings 456, 455 to provide greater surface area for heat exchange between the fins 459 and the reaction space 487 enclosed by the filter 412.

In the stacked embodiment covered in FIGS. 22, 23, 24 it remains to explain the means by which reactants are introduced to the reaction chambers and how the products are withdrawn or transported from one chamber to the other. With respect to the blade 459 of the fins, there is indicated a spine 485 contacting the multiport column, which may be used to directly deliver hot or cold fluids directly to the column from the external sources or it may be used to withdraw products from the reaction 487 space enclosed by the filter 412, where from the products are conducted to one of the ports indicated 445. Other options for product removal include from the outlets 430 in the top unit, outlets 481 in the base unit, and outlet 450 from the plenum 486 embedded in the flange between chambers 461 and 462, which all withdraw from the chamber spaces external to the filters. Feed and withdrawal of reactant solids and fluids, as well as backwashing will occur through inlet 420 and outlet 422 with collector 416 in the base, through the two way valve indicated. There are additionally two two-way valves 482 in the flange between chambers 461 and 462, one of which is located proximal to the multipost column and the other distal to it, such that the split stream product flows 464 and 463, may pass from the bottom 461 chamber to the top 462 or the reverse, from top to bottom, depending on the reactions being accommodated. It will be obvious from FIGS. 7 and 8, having dual drive motors 176 and 142 with dual gears drives 146, and 180, that the top and bottom drive motors 476 and 477 in FIG. 22 may also be dual top and bottom. With such a dual drive in the FIG. 22 stacked embodiment, the number of stacked chambers could therefore be three or four or any number, since the drive shaft core 474 may be nested, one within the other with staggered gearing as in FIGS. 7 and 8. This accommodates multiple stacks, each with separate fin sets, separate circulation systems through the rotary coupling 478, with separate external heating and cooling 444, 445 and rapid product transport between chambers. Gas phase reactions proceed in the second to millisecond time frame, where it is of utmost importance to pass the products of one reaction, for example biogas from pyrolysis, to catalyst for de-oxygenation, to a third catalyst for cracking, to a condenser in a fourth chamber. There are numerous other reactions in the chemical thermal degradation, catalysis and synthesis in which the instantaneous removal of products from feed in rapid sequence insures that unfavorable reactions with weak equilibrium constants may be coupled to stronger ones, insuring non equilibrium thermodynamics, as in coupled biochemical and cellular reactions. Coupling fuels production with fuel cell utilization in stacked centrifugal filters through a flange 454 containing two way valves 482 is an alternative application of centrifugal filtration stacking, where input-output ports are also designed for side-by side stacking of chambers to accommodate multiple coupled reactions and chemistries. The filter element and its submicron apertures may alone or with electro-catalytic and transport ceramics be understood as a multiuse membrane, which, with stacked intercellular chambers, simulate the materials transport and chemical potentials of biological cellular structures.

Figure 25:
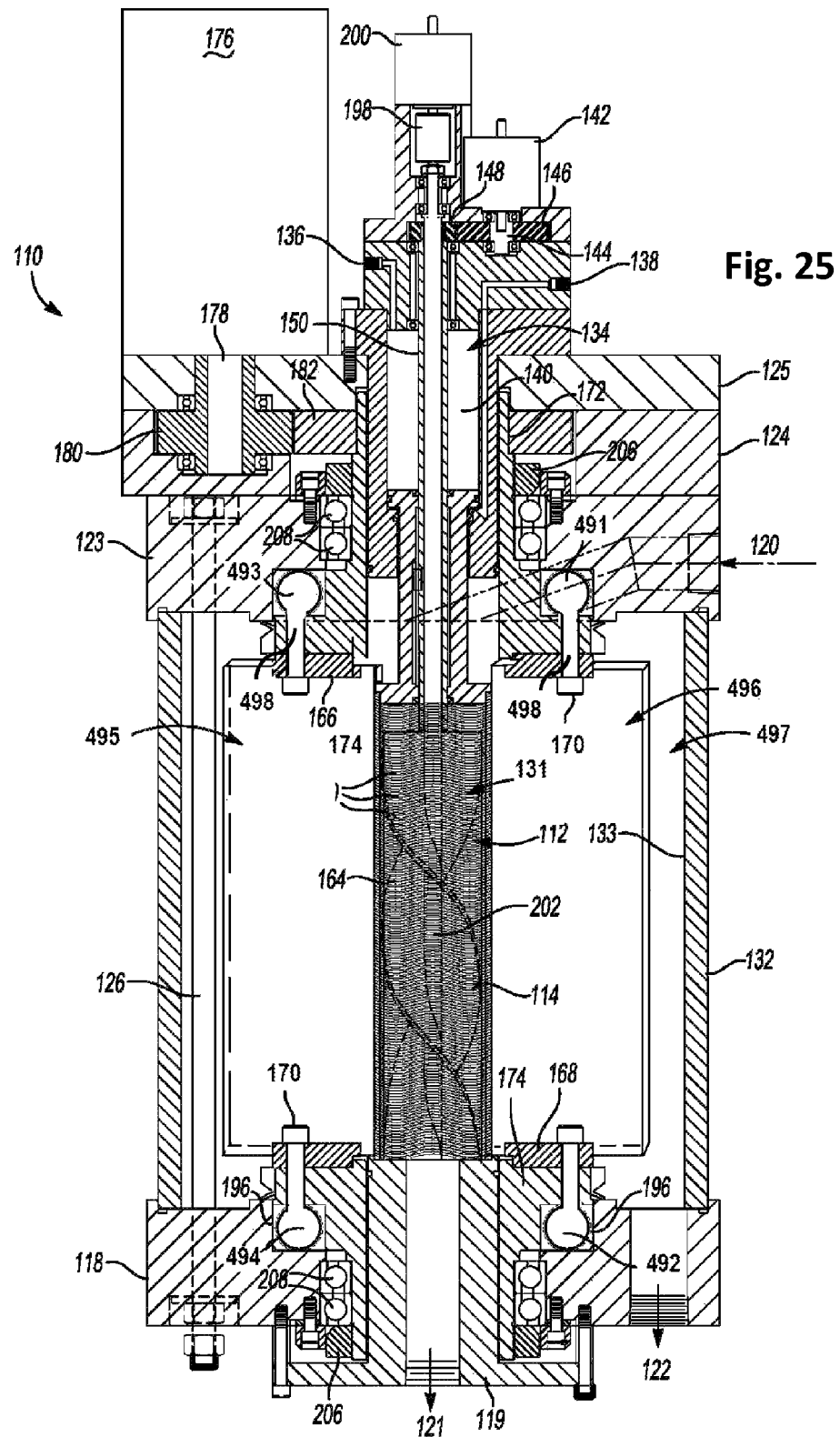
FIG. 25 is a side partially cross-sectioned view of the centrifugal filter apparatus, as in FIG. 8, but showing fluid input and output through pneumatic ports, circulating through hollow radial fins
Figure 26:
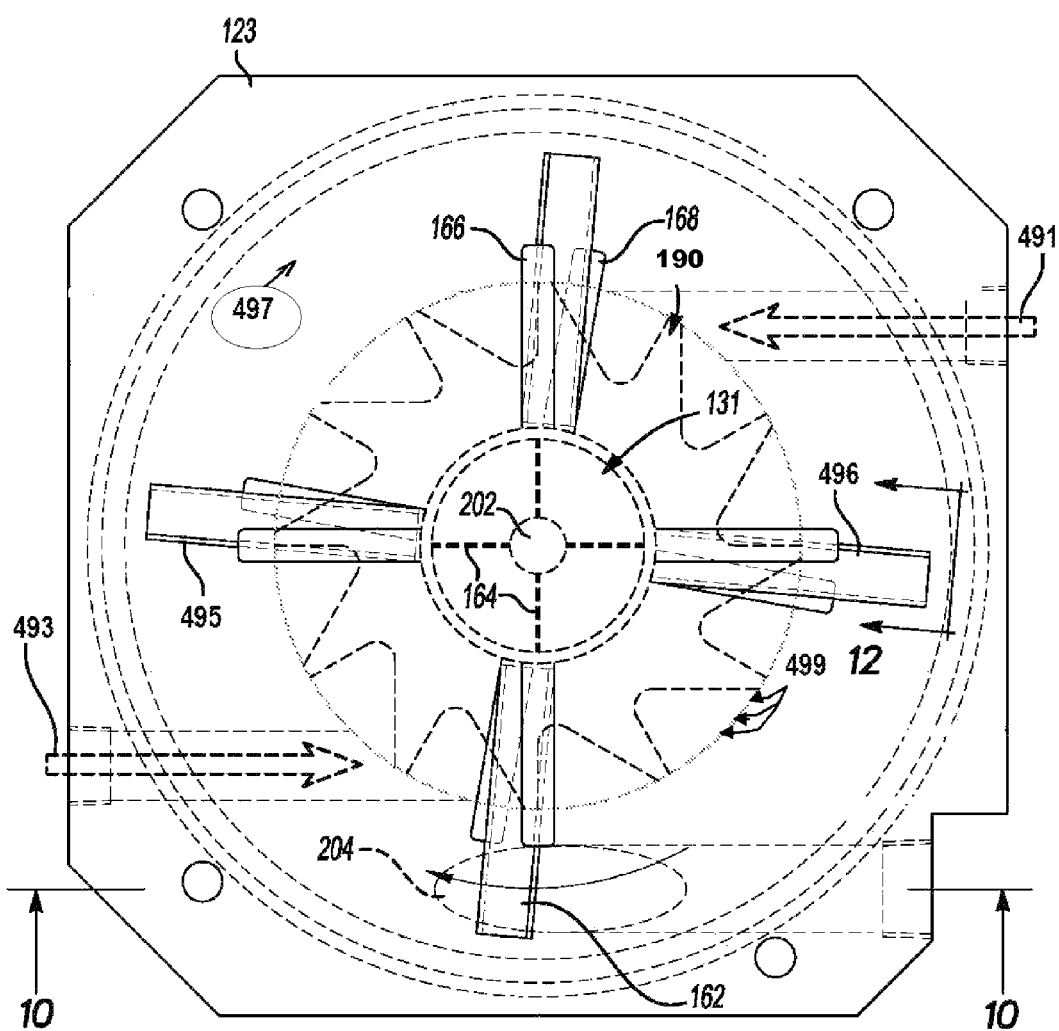
FIG. 26 is a top plan view of the filter assembly shown in FIGS. 8 and 9, with the motors removed, indicating fluid flow into the radial fins through a radial feed disc.

In the earlier disclosed embodiment 110, an electric motor in FIG. 8 drives a driven gear 182 fixed to an upper spindle 172, which rotates the external centrifugal radial fins 162 within an outer filtration chamber 130. As shown in FIG. 9, the upper housing member 123, serving as a cover for the filter canister, includes two pneumatic channels 184 and 186: similarly the lower spindle 174 is also pneumatically driven through pneumatic channels 184, 186 which drives a turbine 190 shown in FIGS. 8 and 9. In the disclosed embodiment of FIG. 25, these same pneumatic drive structures are modified to enable circulation of either cooling or heating purposes. As shown in FIG. 25 the pneumatic channels 493 and 491 and bolt 170 are rigidly connected to the spindle members 174 and turbine 190 shown in FIG. 26. However, in this embodiment, the spindles 174 are bolted to the fin brackets 166 by hollow bolts 498. These hollow bolts inter connect the spindle's 190 chamber 499 with the hollow fin 495. Hot or cold fluids introduced through 493 and 491 flow continuously through the hollow fins 495 and exit through the channels 494 and 496 in the lower spindles. The chamber surrounding the fins is not limited to cylindrical, as the fins are not limited to rectangular and planar shapes, but may be rotate 262 within a frustoconical chamber as noted in FIGS. 16 and 17 and shown in detail in FIG. 13. The motor drives may be top mounted 176, as in FIG. 25 or coupled through a drive shaft at the base 276 as FIGS. 16 and 17. It will be apparent from descriptions for FIGS. 22, 23, 24 that the multiple locations of drive motors, as well as entrance and exit points, are designed for maximum flexibility, such that chambers may be stacked or coupled in series or parallel in hydrocarbon generation processes.

The centrifugal filter embodiment of FIG. 25, as described, is a stand-alone modified embodiment of the basic solids-liquids separation device of FIG. 8, but designed for hydrothermal liquefaction, flash pyrolysis, condensation, and catalysis. For example, the through hole pneumatic driver 136 and 138 will completely shut the filter's apertures in order to contain the feed stock solids, water and alkali in a 4:1 ratio, and sustain pressures within the vessel in excess of 2000 psi. The temperature and pressure is raised within the vesicle by hot fluid circulation through the rotating hollow and spiral fins 495, which are shaped to fit a frusto-conical chamber of FIGS. 16 and 17. While pressure increases with steam generation, it may be necessary to introduce waste organic and accompanying non organic waste under pressures on the order of 2000 psi while at temperatures approaching 350° C. to retain the aqueous component in a liquid state as completely as possible to promote liquefaction of the organics.

During the hydrothermal catagenic process, and while spinning within the closed and valved chamber, organic solids will separate from the heavier non organics, such as glass and metal within the conical chamber 497. As noted in FIGS. 16 and 17, a low speed spin below 500 rpm will force the heavy non organics and excess water toward the canister wall 132. Simultaneously, the liquified oil product collects in a cone next the closed filter 112. The filer's apertures, once opened, as described in FIG. 7, allows the oil product under pressure to exit through the filters core and out the base 121 toward the next phase of the next pyrolytic phase. Opening the filter's solids output valve 122 in like manner forces the solid residues, which have collected 492, to exit the base through the valve at 122. This oil is partially de-polymerized, which process is completed in a second reactor, similar to the first, but operating dry at set temperatures between 500° C. and 800° C. Throughput times are preferably less than a minute at temperatures double those in the first chamber. The heat transfer process is accelerated due to a more efficient exchange between the hot metal fins and liquid crude oil in the absence of oxygen. The carbon chains are thereby de-polymerization to chain lengths on the order of $C_6$-$C_8$. This coupled steam (hydrothermal) reforming process, followed by a flash pyrolysis, accommodates mixed unsorted waste sources as feed stock. The heat source and temperature through the channels 493 and 491 may be regulated by an external heat torch or other on site means as diagrammed at 453, FIG. 21.

The hydrocarbon product from the above hydrocarbon generation process may contain on the order of 10% oxygen, depending on the source of the waste feed stock. A commonly available zeolite is used to filter out this unwanted component by using one of the chamber devices in FIG. 21, 22 or by passing the pyrolyzed vapors products over zeolite loaded internal to the filer 112 with its mixing spiral 164, FIG. 25. The zeolite may, upon saturation, be backwashed and regenerated through 120, as described elsewhere.

There remains a condensation phase in the liquid hydrocarbon sequence. This is accomplished by passing a refrigerant or cryogenic coolant, such as liquid nitrogen, through the channels 493 and 491 from an external source noted in 453, FIG. 21. The rate of passage through the hollow fins 495, 496 and continuous spin to remove the hydrocarbon condensate from the de-superheating cold faces of the fins, under high G-forces, accelerates the process by increasing the heat transfer coefficient. Freezing or adsorption of product fouls the condensing surface; the selection of rpm values will be regulated by load rate.

Figure 27:
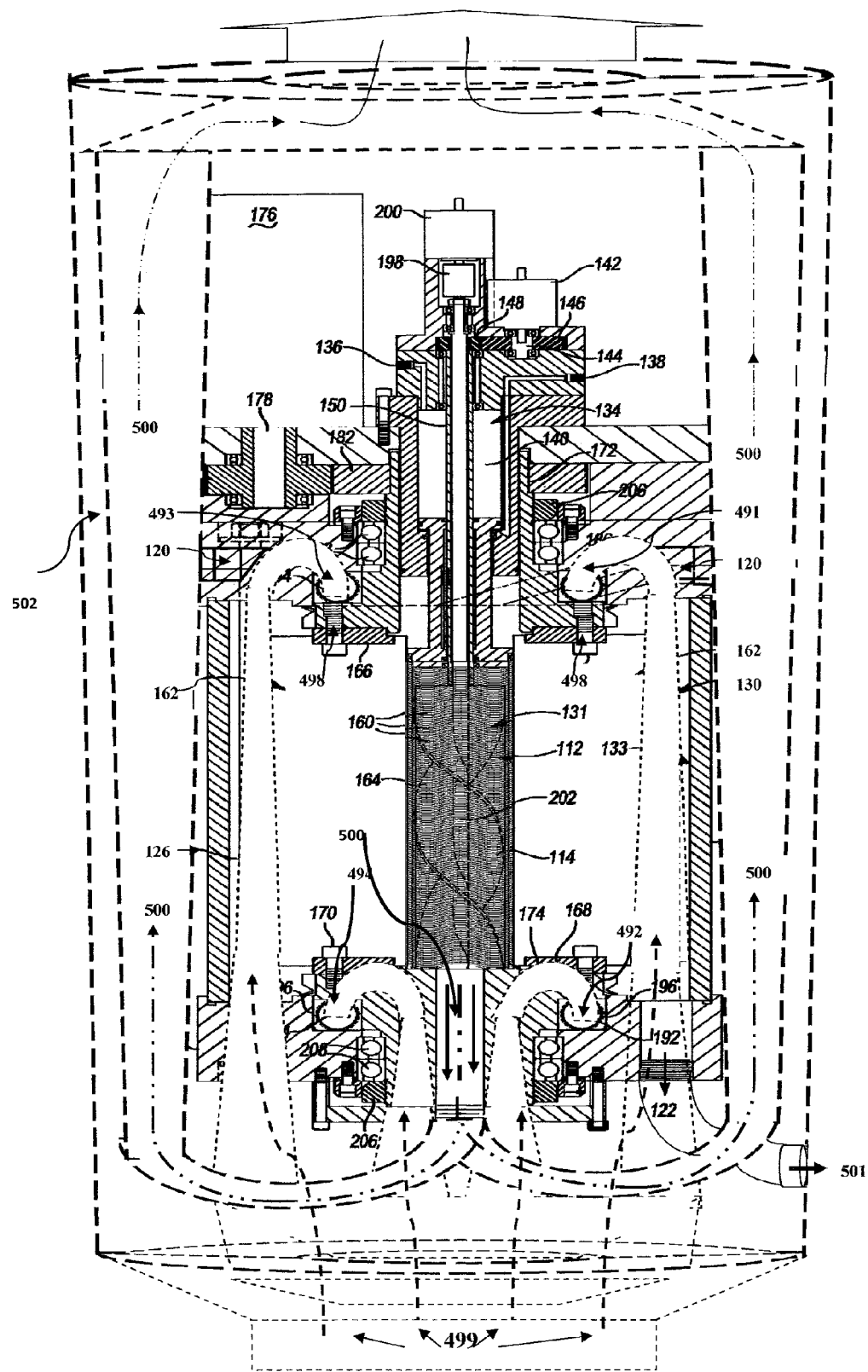
FIG. 27 is a side, partially cross-sectioned view of the centrifugal filter apparatus, as in FIG. 8, but designed to filter effluent stacks of combustion industries or vehicles of transportation as well as power a turbo-generator.
Figure 28:
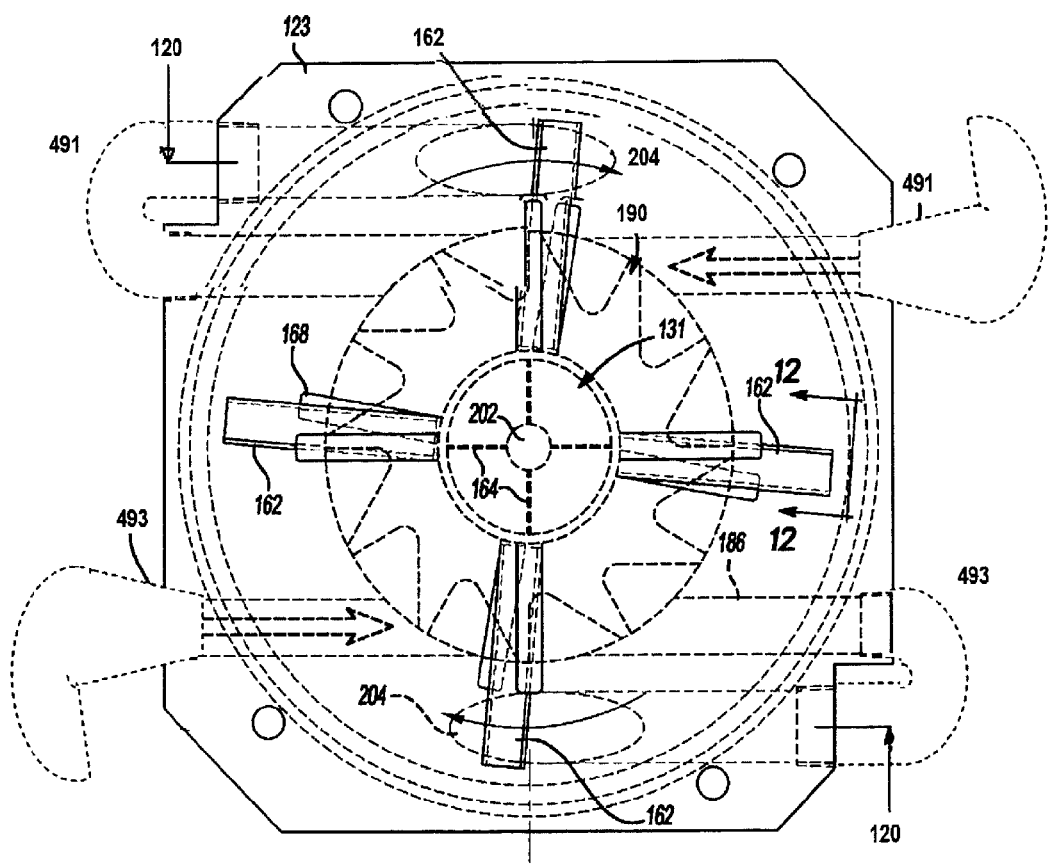
FIG. 28 is a top plan view of the filter assembly of FIG. 27, indicating fluid flow through pneumatic channels over the turbine blades, which drive the turbo-generator.

There is yet another embodiment the follows the modification of the basic centrifugal filter in FIG. 25 with its combined motor and pneumatic drive capabilities. It is evident that the combined drives 172 and 178, riding on the same set of bearings 208 that the motor in FIG. 25, 176 could be replaced with a an electric generator 176 in FIG. 27. This embodiment would suggest that installing the device in an industrial or marine flue stack as in 502 of FIG. 27. The high velocity effluent 499 is conducted into the pneumatic channels 491, 193, 492, 494 of FIG. 27. The electric generator 178 is then driven through its gearing 172, 178 by the turbine blades 190, FIG. 28. The exit velocities at 499 are typically on the order of 1000 to 75,000 cfs. Given the venture confinement on passage through the pneumatic ports 493, 491, 494, 492, the pressure on the turbine blades 190 in the base and header of the device in FIG. 27 would be considerable, which translates to corresponding power output at generator 176. This design constitutes a vertical shaft turbo-generator. Moreover, an additional environmental asset occurs when the exhaust from the turbine blades is reintroduced, as shown in FIG. 28, at 120 into the chamber surrounding the filter 162. The hot gassed exiting pneumatic ports 491 and 493 as shown in the top cross section in FIG. 28, are reintroduced for particulate removal and exit as filtrate at 500 in the base, thereafter conducted the stack's exit point 500. It is therein possible to feed the clean flue gas through an adiabatic heat engine for additional energy recovery from large but inefficient combustion processes. It will be noted that particulates will accumulate at 192 in a centrifugal field, particularly in a cone shaped chamber, where they may be release into a bag filter for storage or disposal. Both the pneumatic orifices in the base and header contribute to centrifugal particulate deposition as well as power generation as noted.

Having described preferred embodiments of the filter apparatus of this invention, the invention is now claimed as follows.

What is claimed is:

1. A reaction filter apparatus including a central annular filter, wherein the central annular filter comprises a dual set of generally cylindrical generally coaxially aligned helical coils, each coil having relatively flat opposed surfaces impregnated with a fuel cell redox active agent creating anodic and cathodic reaction chambers, separated by an electrolyte; and said reaction chambers located external and internal to the redox active impregnated coils, which provides fuels to a dual fuel cell filter element.

2. The reaction filter apparatus as defined by claim 1, wherein each coil of each of said coaxially aligned helical coils include free spaces within its helix into which redox active agents are impregnated, forming cylinders not limited by lengths and corresponding capacity.

3. The reaction filter apparatus as defined by claim 1, wherein each of said coaxially aligned helical coils are one piece impregnated redox agents and electrolyte whose length and cross section is determined by output requirements.

4. The reaction filter apparatus as defined by claim 1, wherein said generally coaxially aligned helical coils comprise a continuous flexible resilient generally cylindrical coil including a plurality of interconnected generally circular helical coils, each coil having a regular sinusoidal shape in the direction of the helix.

5. The reaction filter apparatus as defined by claim 1, wherein the apparatus includes a dual drive mechanism for engaging and separately driving said helical coils.

* * * * *